United States Patent
Wijnands et al.

(10) Patent No.: US 10,659,242 B2
(45) Date of Patent: *May 19, 2020

(54) BIT INDEXED EXPLICIT REPLICATION USING MULTIPROTOCOL LABEL SWITCHING

(71) Applicant: Cisco Technology, Inc., San Jose, CA (US)

(72) Inventors: Ijsbrand Wijnands, Leuven (BE); Gregory J. Shepherd, Eugene, OR (US); Christian J. Martin, Rumson, NJ (US); Neale D. R. Ranns, Basingstoke (GB); Jesper Skriver, Latsia (CY)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,907

(22) Filed: Jul. 31, 2018

(65) Prior Publication Data
US 2019/0058606 A1    Feb. 21, 2019

Related U.S. Application Data

(63) Continuation of application No. 14/488,790, filed on Sep. 17, 2014, now Pat. No. 10,225,090.
(Continued)

(51) Int. Cl.
*H04L 12/18*    (2006.01)
*H04L 12/761*    (2013.01)
(Continued)

(52) U.S. Cl.
CPC .......... *H04L 12/18* (2013.01); *H04L 12/1886* (2013.01); *H04L 45/16* (2013.01);
(Continued)

(58) Field of Classification Search
None
See application file for complete search history.

(56) References Cited

U.S. PATENT DOCUMENTS

| 5,088,091 A | 2/1992 | Schroeder |
| 5,138,615 A | 8/1992 | Lamport |

(Continued)

FOREIGN PATENT DOCUMENTS

| CN | 1754353 | 3/2006 |
| CN | 1792065 | 6/2006 |

(Continued)

OTHER PUBLICATIONS

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

(Continued)

*Primary Examiner* — Gregory B Sefcheck
*Assistant Examiner* — Amar Persaud
(74) *Attorney, Agent, or Firm* — Campbell Stephenson LLP

(57) ABSTRACT

Various systems and methods for performing bit indexed explicit replication (BIER) using multiprotocol label switching (MPLS). For example, one method involves receiving a packet that includes a MPLS label. The packet also includes a multicast forwarding entry. The method also involves determining, based on the value of the MPLS label, whether to use the multicast forwarding entry to forward the packet. The method further includes forwarding the packet.

20 Claims, 23 Drawing Sheets

Related U.S. Application Data

(60) Provisional application No. 61/931,473, filed on Jan. 24, 2014, provisional application No. 61/878,693, filed on Sep. 17, 2013.

(51) Int. Cl.
*H04L 12/741* (2013.01)
*H04L 12/705* (2013.01)
*H04L 12/723* (2013.01)

(52) U.S. Cl.
CPC .............. *H04L 45/74* (2013.01); *H04L 45/18* (2013.01); *H04L 45/50* (2013.01)

(56) References Cited

U.S. PATENT DOCUMENTS

| | | |
|---|---|---|
| 5,764,624 A | 6/1998 | Endo |
| 5,999,531 A | 12/1999 | Ferolito |
| 6,130,881 A | 10/2000 | Stiller |
| 6,147,976 A | 11/2000 | Shand |
| 6,148,000 A | 11/2000 | Feldman |
| 6,240,188 B1 | 5/2001 | Dondeti |
| 6,615,336 B1 | 9/2003 | Chen |
| 6,771,673 B1 | 8/2004 | Baum |
| 6,778,532 B1 | 8/2004 | Akahane |
| 6,873,627 B1 | 3/2005 | Miller |
| 7,111,101 B1 | 9/2006 | Bourke |
| 7,281,085 B1 | 10/2007 | Garg |
| 7,519,733 B1 | 4/2009 | Thubert |
| 7,551,599 B2 | 6/2009 | Levit |
| 7,925,778 B1 | 4/2011 | Wijnands |
| 8,320,374 B2 | 11/2012 | de Heer |
| 8,325,726 B2 | 12/2012 | Baban et al. |
| 8,670,146 B1 | 3/2014 | Van Couvering |
| 8,774,179 B1 | 7/2014 | Gaggara |
| 8,787,400 B1 | 7/2014 | Barth |
| 8,830,826 B2 | 9/2014 | Chen |
| 8,848,728 B1 | 9/2014 | Revah |
| 8,880,869 B1 | 11/2014 | Shah |
| 8,890,903 B2 | 11/2014 | Russell |
| 8,942,256 B1 | 1/2015 | Barth |
| 9,065,766 B2 | 6/2015 | Matsuoka |
| 9,455,918 B1 | 9/2016 | Revah |
| 2002/0126661 A1 | 9/2002 | Ngai |
| 2002/0191628 A1 | 12/2002 | Liu |
| 2003/0043802 A1 | 3/2003 | Yazaki |
| 2003/0048779 A1 | 3/2003 | Doherty |
| 2003/0088696 A1 | 5/2003 | McCanne |
| 2003/0142685 A1 | 7/2003 | Bare |
| 2003/0210695 A1 | 11/2003 | Henrion |
| 2004/0190526 A1* | 9/2004 | Kumar .................. H04L 45/302 370/395.21 |
| 2004/0190527 A1 | 9/2004 | Okura |
| 2004/0240442 A1 | 12/2004 | Grimminger |
| 2004/0264374 A1 | 12/2004 | Yu |
| 2005/0018693 A1 | 1/2005 | Dull |
| 2005/0157724 A1 | 7/2005 | Montuno |
| 2005/0169270 A1 | 8/2005 | Mutou |
| 2005/0181807 A1 | 8/2005 | Dowling |
| 2005/0232272 A1 | 10/2005 | Deng |
| 2006/0133298 A1 | 6/2006 | Ng |
| 2006/0182035 A1 | 8/2006 | Vasseur |
| 2006/0187817 A1 | 8/2006 | Charzinski |
| 2006/0280192 A1 | 12/2006 | Desanti |
| 2006/0291444 A1 | 12/2006 | Alvarez |
| 2007/0115968 A1* | 5/2007 | Brown .................. H04L 45/745 370/389 |
| 2007/0127474 A1 | 6/2007 | Mirtorabi et al. |
| 2007/0189291 A1 | 8/2007 | Tian |
| 2008/0069125 A1 | 3/2008 | Reed |
| 2008/0159285 A1 | 7/2008 | De Heer |
| 2008/0165783 A1 | 7/2008 | Desanti |
| 2008/0194240 A1 | 8/2008 | Dowling |
| 2008/0212465 A1 | 9/2008 | Yan |
| 2008/0240105 A1 | 10/2008 | Abdallah |
| 2008/0316916 A1 | 12/2008 | Tazzari |
| 2009/0067348 A1 | 3/2009 | Vasseur |
| 2009/0185549 A1 | 7/2009 | Shon |
| 2009/0196289 A1 | 8/2009 | Shankar |
| 2009/0213735 A1 | 8/2009 | Check |
| 2009/0219817 A1 | 9/2009 | Carley |
| 2009/0225650 A1 | 9/2009 | Vasseur |
| 2009/0310610 A1 | 12/2009 | Sandstrom |
| 2010/0046400 A1 | 2/2010 | Wu |
| 2010/0046515 A1 | 2/2010 | Wong |
| 2010/0124225 A1 | 5/2010 | Fedyk |
| 2010/0191911 A1 | 7/2010 | Heddes |
| 2011/0149973 A1 | 6/2011 | Esteve Rothenberg |
| 2011/0202761 A1 | 8/2011 | Sarela et al. |
| 2011/0228770 A1 | 9/2011 | Dholakia |
| 2011/0238816 A1 | 9/2011 | Vohra |
| 2011/0274112 A1 | 11/2011 | Czaszar |
| 2011/0299531 A1 | 12/2011 | Yu |
| 2012/0075988 A1 | 3/2012 | Lu |
| 2012/0099591 A1 | 4/2012 | Kotha |
| 2012/0106560 A1 | 5/2012 | Gumaste |
| 2012/0198064 A1 | 8/2012 | Boutros |
| 2012/0236857 A1 | 9/2012 | Manzella |
| 2012/0243539 A1 | 9/2012 | Keesara |
| 2013/0034097 A1 | 2/2013 | Dharmapurikar |
| 2013/0051376 A1 | 2/2013 | Hatashita |
| 2013/0107725 A1 | 5/2013 | Jeng |
| 2013/0114595 A1 | 5/2013 | Mack-Crane |
| 2013/0114619 A1 | 5/2013 | Wakumoto |
| 2013/0136117 A1 | 5/2013 | Schrum, Jr. |
| 2013/0136123 A1 | 5/2013 | Ge |
| 2013/0170450 A1 | 7/2013 | Anchan |
| 2013/0195001 A1 | 8/2013 | Liu |
| 2013/0201988 A1 | 8/2013 | Zhou |
| 2013/0308948 A1 | 11/2013 | Swinkels |
| 2013/0329728 A1 | 12/2013 | Ramesh |
| 2013/0336315 A1 | 12/2013 | Guichard |
| 2013/0343384 A1 | 12/2013 | Shepherd |
| 2014/0010074 A1 | 1/2014 | Ye |
| 2014/0010223 A1 | 1/2014 | Wang |
| 2014/0025821 A1 | 1/2014 | Baphna et al. |
| 2014/0043964 A1 | 2/2014 | Gabriel |
| 2014/0064081 A1 | 3/2014 | Morandin |
| 2014/0098813 A1 | 4/2014 | Mishra |
| 2014/0119191 A1 | 5/2014 | Onoue |
| 2014/0126575 A1 | 5/2014 | Janneteau |
| 2014/0160925 A1 | 6/2014 | Xu |
| 2014/0189174 A1 | 7/2014 | Ajanovic |
| 2014/0241357 A1 | 8/2014 | Liu et al. |
| 2014/0362846 A1 | 12/2014 | Li |
| 2014/0369356 A1 | 12/2014 | Bryant |
| 2015/0003458 A1 | 1/2015 | Li |
| 2015/0009823 A1 | 1/2015 | Ganga |
| 2015/0016469 A1 | 1/2015 | Ganichev |
| 2015/0023328 A1 | 1/2015 | Thubert et al. |
| 2015/0049760 A1 | 2/2015 | Xu |
| 2015/0078377 A1 | 3/2015 | Wijnands et al. |
| 2015/0078378 A1 | 3/2015 | Wijnands et al. |
| 2015/0078379 A1 | 3/2015 | Wijnands et al. |
| 2015/0078380 A1 | 3/2015 | Wijnands et al. |
| 2015/0081941 A1 | 3/2015 | Brown |
| 2015/0085635 A1 | 3/2015 | Wijnands et al. |
| 2015/0092546 A1 | 4/2015 | Baratam |
| 2015/0131658 A1 | 5/2015 | Wijnands et al. |
| 2015/0131659 A1 | 5/2015 | Wijnands et al. |
| 2015/0131660 A1 | 5/2015 | Wijnands et al. |
| 2015/0138961 A1 | 5/2015 | Wijnands et al. |
| 2015/0139228 A1 | 5/2015 | Wijnands et al. |
| 2015/0172190 A1* | 6/2015 | Song .................. H04L 12/4641 370/390 |
| 2015/0181309 A1 | 6/2015 | Wijnands et al. |
| 2015/0249587 A1 | 9/2015 | Kozat |
| 2015/0319086 A1 | 11/2015 | Tripathi |
| 2015/0334006 A1 | 11/2015 | Shao |
| 2016/0087890 A1* | 3/2016 | Przygienda .............. H04L 45/16 370/255 |
| 2016/0119159 A1* | 4/2016 | Zhao .................. H04L 12/1854 370/390 |

(56) References Cited

U.S. PATENT DOCUMENTS

| | | | |
|---|---|---|---|
| 2016/0127139 A1* | 5/2016 | Tian | H04L 45/16 370/390 |
| 2016/0127142 A1* | 5/2016 | Tian | H04L 12/1886 370/390 |
| 2016/0134518 A1* | 5/2016 | Callon | H04L 45/24 370/390 |
| 2016/0134535 A1* | 5/2016 | Callon | H04L 45/48 370/390 |
| 2016/0142248 A1 | 5/2016 | Thubert et al. | |
| 2016/0182353 A1 | 6/2016 | Garcia-Luna-Aceves | |
| 2016/0191372 A1* | 6/2016 | Zhang | H04L 45/16 370/390 |
| 2016/0205588 A1 | 7/2016 | Liu | |
| 2016/0218961 A1 | 7/2016 | Lindem | |
| 2016/0226725 A1 | 8/2016 | Iizuka | |
| 2016/0254987 A1 | 9/2016 | Eckert et al. | |
| 2016/0254988 A1 | 9/2016 | Eckert et al. | |
| 2016/0254991 A1 | 9/2016 | Eckert et al. | |
| 2016/0344616 A1 | 11/2016 | Roch | |
| 2017/0012880 A1 | 1/2017 | Yang | |
| 2017/0099232 A1 | 4/2017 | Shepherd | |
| 2017/0126416 A1 | 5/2017 | McCormick | |
| 2017/0142006 A1 | 5/2017 | Wijnands et al. | |
| 2017/0302566 A1* | 10/2017 | Zhang | H04L 45/16 |
| 2018/0083790 A1 | 3/2018 | Wijnands et al. | |
| 2018/0091473 A1 | 3/2018 | Wijnands et al. | |
| 2018/0102965 A1 | 4/2018 | Hari | |
| 2018/0131532 A1 | 5/2018 | Wijnands et al. | |
| 2018/0205565 A1 | 7/2018 | Wijnands et al. | |
| 2018/0205636 A1* | 7/2018 | Hu | H04L 45/16 |
| 2018/0278470 A1 | 9/2018 | Wijnands et al. | |
| 2018/0287934 A1 | 10/2018 | Wang | |
| 2018/0287935 A1 | 10/2018 | Wang | |
| 2018/0309664 A1 | 10/2018 | Balasubramanian | |
| 2018/0316520 A1 | 11/2018 | Wijnands et al. | |
| 2019/0013964 A1 | 1/2019 | Wijnands | |
| 2019/0014034 A1 | 1/2019 | Allan | |
| 2019/0020574 A1 | 1/2019 | Eckert et al. | |
| 2019/0075041 A1* | 3/2019 | Wang | H04L 41/0806 |
| 2019/0116114 A1* | 4/2019 | Chen | H04L 45/24 |
| 2019/0327168 A1 | 10/2019 | Eckert et al. | |

FOREIGN PATENT DOCUMENTS

| | | |
|---|---|---|
| CN | 101242413 | 8/2008 |
| CN | 101385275 | 3/2009 |
| CN | 101572667 | 11/2009 |
| CN | 101689172 | 3/2010 |
| CN | 102025538 | 4/2011 |
| CN | 102577238 | 7/2012 |
| WO | WO 2007/095331 | 8/2007 |

OTHER PUBLICATIONS

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.;"Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffsery—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc.;"IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Li, Tony et al., "IGP Requirements for Traffic Engineering With MPLS, draft-li-mpls-igp-te-00.txt," Network Working Group, Internet-Draft, Feb. 1999, pp. 1-6.

Microsoft, "IPv6 Addressing (TechRef)"; Apr. 3, 2011; https://technet.microsoft.com/en-us/library/dd392266(v=ws.10).aspx; pp. 1-30.

Moy, J., Ascend Communications, Inc., "OSPF Version 2," Network Working Group, Request for Comments 2328, Apr. 1998, pp. 1-244.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Psenak, P. et al., "OSPF Extensions for Segment Routing, draft-psenak-ospf-segment-routing-extension-05," Open Shortest Path First IGP, Internet-Draft, Jun. 2014, pp. 1-33.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-13vpn-mvpn-bier-01," Internet Engineering Task Force, Internet-Draft, Oct. 16, 2014, pp. 1-9.

Schulzrinne, H. et al.,; "RTP: A Transport Protocol for Real-Time Applications," Network Working Group, Request for Comments 3550, Jul. 2003, pp. 1-89.

Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.

Shen, N. et al., "Calculating Interior Gateway Protocol (IGP) Routes Over Traffic Engineering Tunnels," Network Working Group, Request for Comments 3906, Oct. 2004, pp. 1-8.

SMPTE, "Beyond the Digital Conversion, The Integration of Information Technology and Professional Media, The Convergence of 2 Industries—The Adoption of Information Technology by the Professional Media Industry; Report of the SMPTE Study Group on

(56) References Cited

OTHER PUBLICATIONS

Media Production System Network Architecture," Mar. 31, 2014, © 2014 by the Society of Motion Picture and Television Engineers, Inc. (SMPTE), pp. 1-65.

SMPTE, "Transport of High Bit Rate Media Signals Over IP Networks (HBRMT)," ST 2022-6:2012, © 2015 by the Society of Motion Picture and Television Engineers, Inc. (SMPTE), p. 1.

SMPTE, "Definition of Vertical Interval Switching Point for Synchronous Video Switching," RP 168:2009, © 2015 by the Society of Motion Picture and Television Engineers, Inc. (SMPTE), p. 1.

Whitcomb, Leigh, "Real-Time Professional Broadcast Signals Over IP Networks," Harris Corporation, Technology Conference, Apr. 2011, pp. 1-60.

Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.

Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.

Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.

Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.

Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.

Xu, X. et al., "BIER Encapsulation, draft-xu-bier-encapsulation-00," Network Working Group, Internet-Draft, Sep. 30, 2014, pp. 1-6.

Xu, X. et al., "BIER Encapsulation, draft-xu-bier-encapsulation-01," Network Working Group, Internet-Draft, Oct. 20, 2014, pp. 1-6.

Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].

Wijnands, Isjbrand et al., "Bit Indexed Explicit Forwarding Optimization"; U.S. Appl. No. 16/525,649, filed Jul. 30, 2019; consisting of Specification, Claims, Abstract, and Drawings (49 pages).

Wang, Xiaorong et al., "Multicast Traffic Steering Using Tree Identity in Bit Indexed Explicit Replication (BIER)"; U.S. Appl. No. 16/557,065, filed Aug. 30, 2019; consisting of Specification, Claims, Abstract, and Drawings (96 pages).

Wijnands, Isjbrand et al., "Overlay Signaling for Bit Indexed Explicit Replication"; U.S. Appl. No. 16/654,078, filed Oct. 16, 2019; consisting of Specification, Claims, Abstract, and Drawings (53 pages).

Wijnands, Ijsbrand et al., "Bit Indexed Explicit Replication"; U.S. Appl. No. 16/669,653, filed Oct. 31, 2019; consisting of Specification, Claims, Abstract, and Drawings (49 pages).

\* cited by examiner

500

| Bit Routing Table A | | | |
|---|---|---|---|
| RID | Set:BP | Label | NBR |
| D/32 | 0:1 | 50 | B |
| F/32 | 0:2 | 70 | B |
| C/32 | -- | 40 | B |
| E/32 | 1:1 | 60 | B |
| B/32 | -- | 30 | B |

| Bit Routing Table B | | | |
|---|---|---|---|
| RID | Set:BP | Label | NBR |
| D/32 | 0:1 | 50 | C |
| F/32 | 0:2 | 70 | C |
| C/32 | -- | 40 | C |
| E/32 | 1:1 | 60 | E |
| A/32 | 0:3 | 20 | A |

*FIG. 5C*

640
Bit Forwarding Table A

| LL | BP | BM | NBR | RL |
|---|---|---|---|---|
| 20 | 1 | 0011 | B | 30 |
|  | 2 | 0011 | B | 30 |
| 21 | 1 | 0001 | B | 31 |

*FIG. 6B*

660
Bit Forwarding Table B

| LL | BP | BM | NBR | RL |
|---|---|---|---|---|
| 30 | 1 | 0011 | C | 40 |
|  | 2 | 0011 | C | 40 |
|  | 3 | 0100 | A | 20 |
| 31 | 1 | 0001 | E | 61 |

Bit Routing Table B

| RID  | Set:BP | Label | NBR |
|------|--------|-------|-----|
| D/32 | 0:1    | 50    | C   |
| F/32 | 0:2    | 70    | C   |
|      |        |       | E   |
| C/32 | --     | 40    | C   |
| E/32 | 1:1    | 60    | E   |
| A/32 | 0:3    | 20    | A   |

Bit Forwarding Table B

| LL | BP | BM   | NBR | RL |
|----|----|------|-----|----|
| 30 | 1  | 0011 | C   | 40 |
|    | 2  | 0011 | C   | 40 |
|    |    | 0010 | E   | 60 |
|    | 3  | 0100 | A   | 20 |
| 31 | 1  | 0001 | E   | 61 |

| Bit Routing Table B ||||
|---|---|---|---|
| RID | VBP | Label | NBR |
| D/32 | 5 | 4:50<br>8:55 | C |
| F/32 | 2 | 4:70<br>8:75 | C |
| C/32 | -- | 4:40 | C |
| E/32 | 1 | 4:60<br>8:65 | E |
| A/32 | 3 | 4:20<br>8:25 | A |
| B/32 | -- | 4:30<br>8:35 | -- |

1502 → RID, 1504 → VBP, 1506 → Label, 1508 → NBR

| Bit Forwarding Table B |||||
|---|---|---|---|---|
| LL | BP | BM | NBR | RL |
| 30 | 1 | 0001 | E | 60 |
|  | 2 | 0010 | C | 40 |
|  | 3 | 0100 | A | 20 |
| 31 | 1 | 0001 | C | 41 |
| 35 | 1 | 00000001 | E | 65 |
|  | 2 | 00010010 | C | -- |
|  | 3 | 00000100 | A | 25 |
|  | 5 | 00010010 | C | -- |

1522 → LL, 1524 → BP, 1526 → BM, 1528 → NBR, 1530 → RL

| Bit Forwarding Table B ||||| 
|---|---|---|---|---|
| LL | BP | BM | NBR | RL |
| 30 | 1 | 0001 | E | 60 |
|  | 2 | 0010 | C | 40 |
|  | 3 | 0100 | A | 20 |
| 31 | 1 | 0001 | C | 41 |
| 35 | 1 | 00000001 | E | 65 |
|  | 2 | 00000010 | C | 40 |
|  | 3 | 00000100 | A | 25 |
|  | 5 | 00010000 | C | 41 |

1542 — 1550 — 1544 — 1546 — 1548

FIG. 15C ically formatted as packets and forwarded using forwarding tables.

BIT INDEXED EXPLICIT REPLICATION USING MULTIPROTOCOL LABEL SWITCHING

RELATED APPLICATIONS

The present patent application is a continuation of U.S. patent application Ser. No. 14/488,790, filed on Sep. 17, 2014, entitled "Bit Indexed Explicit Replication Using Multiprotocol Label Switching" which claims the domestic benefit under Title 35 of the United States Code § 119(e) of U.S. Provisional Patent Application Ser. No. 61/878,693 entitled "Multicast IPv6 with Bit Mask Forwarding" filed Sep. 17, 2013, and U.S. Provisional Patent Application Ser. No. 61/931,473 entitled "Bit Mask Forwarding Architectures for Stateless Multipoint Replication" filed Jan. 24, 2014, all of which are hereby incorporated by reference in their entirety and for all purposes as if completely and fully set forth herein.

BACKGROUND

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. Multicast is the preferred method of data forwarding for many networks. One reason for this is that multicast is a bandwidth-conserving technology that reduces traffic by simultaneously delivering data to multiple receivers. However, in traditional multicast systems, a relatively large amount of control plane information is used. Setting up and maintaining this control information has a tendency to become complex and costly in terms of computing resources, and can become a major limiting factor in overall network performance Another issue with multicast is that due to packet delivery mechanisms used, packets are sometimes forwarded to locations where the packets were not desired. This unnecessary delivery of packets represents an unwelcome burden on network performance Overcoming this burden by traditional means involves generation and maintenance of even more control plane information.

BRIEF DESCRIPTION OF THE DRAWINGS

The present disclosure may be better understood, and its numerous objects, features and advantages made apparent to those skilled in the art by referencing the accompanying drawings.

FIG. 5B is an example table generated by node of FIG. 4.

FIG. 5C is an example table generated by node of FIG. 4.

FIG. 6B is an example table generated by node of FIG. 4.

FIG. 6C is an example table generated by node of FIG. 4.

FIG. 13A is an example table generated by a node of FIG. 12.

FIG. 13B is an example table generated by a node of FIG. 12.

FIG. 15A is an example table generated by a node of FIG. 12.

FIG. 15B is an example table generated by a node of FIG. 12.

FIG. 15C is an example table generated by a node of FIG. 12.

DETAILED DESCRIPTION

Overview

Various systems and methods for performing bit indexed explicit replication (BIER) using multiprotocol label switching (MPLS). For example, one method involves receiving a packet that includes a MPLS label. The packet also includes a multicast forwarding entry. The method also involves determining, based on the value of the MPLS label, whether to use the multicast forwarding entry to forward the packet. The method further includes forwarding the packet.

Multicast

Multicast delivers multicast data packets (data packets that traditionally include information identifying a multicast group, such as a multicast group address) from a source to multiple receivers without unduly burdening the source. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Figure 1A:
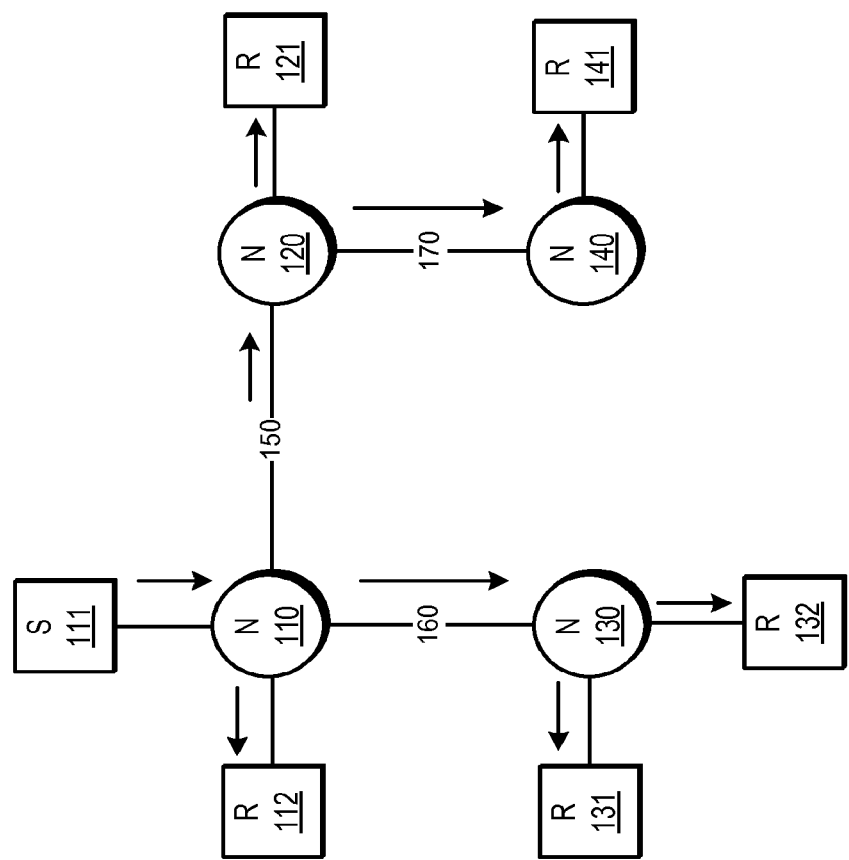
FIG. 1A is a simplified block diagram illustrating certain components of an example network.

FIG. 1A is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected to a multicast distribution tree (MDT) to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using join messages, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110 as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

As can be seen, the process traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability.

MPLS

Multiprotocol Label Switching (MPLS) is commonly employed in provider networks. Traditionally, packets (e.g., multicast data packets) enter an MPLS network via an ingress edge node, travel hop-by-hop along a label-switched path (LSP) that typically includes one or more core nodes, and exit via an egress edge node. An MPLS network is also called an MPLS domain, where "MPLS domain" refers to a portion of a larger network containing devices configured to operate using MPLS.

Packets are forwarded along an LSP based on labels and Label Distribution Protocol (LDP) forwarding tables. Labels allow for the use of very fast and simple forwarding engines in the data plane of a network node, as compared to IP forwarding in which the destination IP address must be retrieved from the packet header at each node. Another benefit of MPLS is the elimination of dependence on a particular Open Systems Interconnection (OSI) model data link layer technology to forward packets.

A label is a short (compared, for example, to an IPv4 or IPv6 address), fixed-length, locally significant identifier. An MPLS label is implemented as a 32-bit identifier, with the lowest 20 bits allocated to the label value. The MPLS label is inserted between the IP header and data link layer header (for example, an Ethernet header) of a packet. In certain situations, such as when one MPLS domain is contained within another domain, more than one label is carried by a packet, forming a label stack. The uppermost label in a stack is closest to the data link layer header (i.e., closest to the outside of the packet). A node generally needs to read only the uppermost label in the stack for packet forwarding purposes.

MPLS labels can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is a protocol employed in the control planes of nodes. Two nodes, called LDP peers, can bi-directionally exchange labels on a FEC-by-FEC basis. LDP, along with underlying routing information provided using an IGP, can be used in a process of building and maintaining LDP forwarding tables that map next labels and next-hop egress interfaces. These forwarding tables can be used to forward packets through MPLS networks.

When a node receives a packet with a label (e.g., the incoming label), the node accesses an LDP forwarding table to read a next hop egress interface and another label (i.e., an outgoing label), both of which are mapped to the incoming label. Before the packet is forwarded via the egress interface, the node swaps the incoming label with the outgoing label. The next hop receives the packet with label and may perform the same process. This process is often called hop-by-hop forwarding along a non-explicit path. The penultimate node in the LSP may "pop" or remove the incoming label before forwarding the packet to an egress edge node in the network, which in turn may forward the packet towards its destination using the packet's destination address and an IP forwarding table.

When LDP is used to exchange labels and set up LSPs in an MPLS network, the LSPs are typically established based on a shortest-path algorithm Multiple LSPs between the same source and destination nodes may also be established for purposes of load-balancing in the network, through, for example, equal-cost multi-path (ECMP) load balancing. An alternative to using LDP in MPLS networks is to establish an explicit path using a protocol called Resource Reservation Protocol with Traffic Engineering (RSVP-TE) instead of or in addition to LDP. An explicit path or "tunnel" is specified using RSVP-TE when the initial node sends a request message from node to node along the length of the requested path, and the final node of the path confirms by sending back along the path an MPLS label to be used for the path. This label is then added to the forwarding tables of the nodes along the path. This reservation process is completed before any traffic can flow along the explicit path, and is done again if the path is altered in response to a change in network topology or conditions.

Figure 1B:
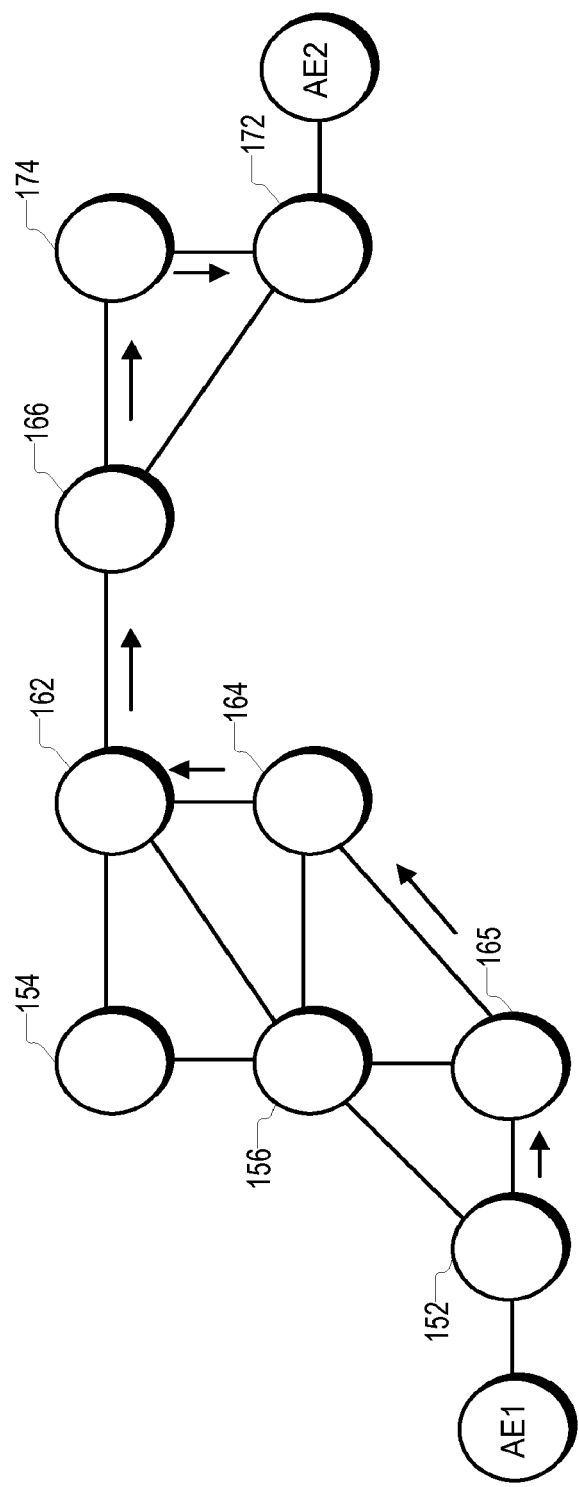
FIG. 1B is a simplified block diagram illustrating certain components of an example network.

To illustrate the concept of an MPLS LSP, FIG. 1B shows a portion of an example MPLS network 180 between access network nodes AE1 and AE2 which may connect, for example, to a traditional IP network. The MPLS network includes nodes 152-174 coupled together via communication links. An LSP from node 152 to node 172 can be created so that all packets of a stream associated with a particular FEC sent from node 152 to node 172 will travel through the same set of nodes. Each node maintains information for an LSP established through it in an LDP forwarding table. Thus, if node 165 knows that node 164 is the next hop along the LSP for all packets received from node 152 that are destined for node 172, node 165 can forward the packets to node 164.

With multicast forwarding there is a trade-off between optimal forwarding and aggregation. Optimal forwarding is achieved if each multicast flow has its own LSP. Using a unique LSP for each multicast flow results in multicast data packets being sent only to receivers that request the multicast flow. However, this results in large numbers of LSPs being created. As the number of LSPs becomes large, some form of aggregation can be applied. Aggregation refers to multiple multicast flows sharing a single LSP. However, this leads to flooding. That is, when multiple multicast flows use a single LSP, multicast data packets from some of the multicast flows are sent to receivers that have not requested the multicast flow. The reason this happens is because the receiver population of the different multicast flows is likely to be different for each multicast flow. Such flooding represents an unwelcome burden on network resources, and reducing this burden by traditional means involves creating and maintaining additional control plane information, which in itself represents another burden on network performance Bit Indexed Explicit Replication As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified nodes. Not only does BIER greatly reduce the amount of state information utilized in a network, when implemented using MPLS, BIER eliminates the flooding that results from, for example, aggregation of multiple multicast flows onto a single LSP. The following describes BIER using MPLS. It should be understood that BIER is not limited to any particular routing protocol.

Figure 2:
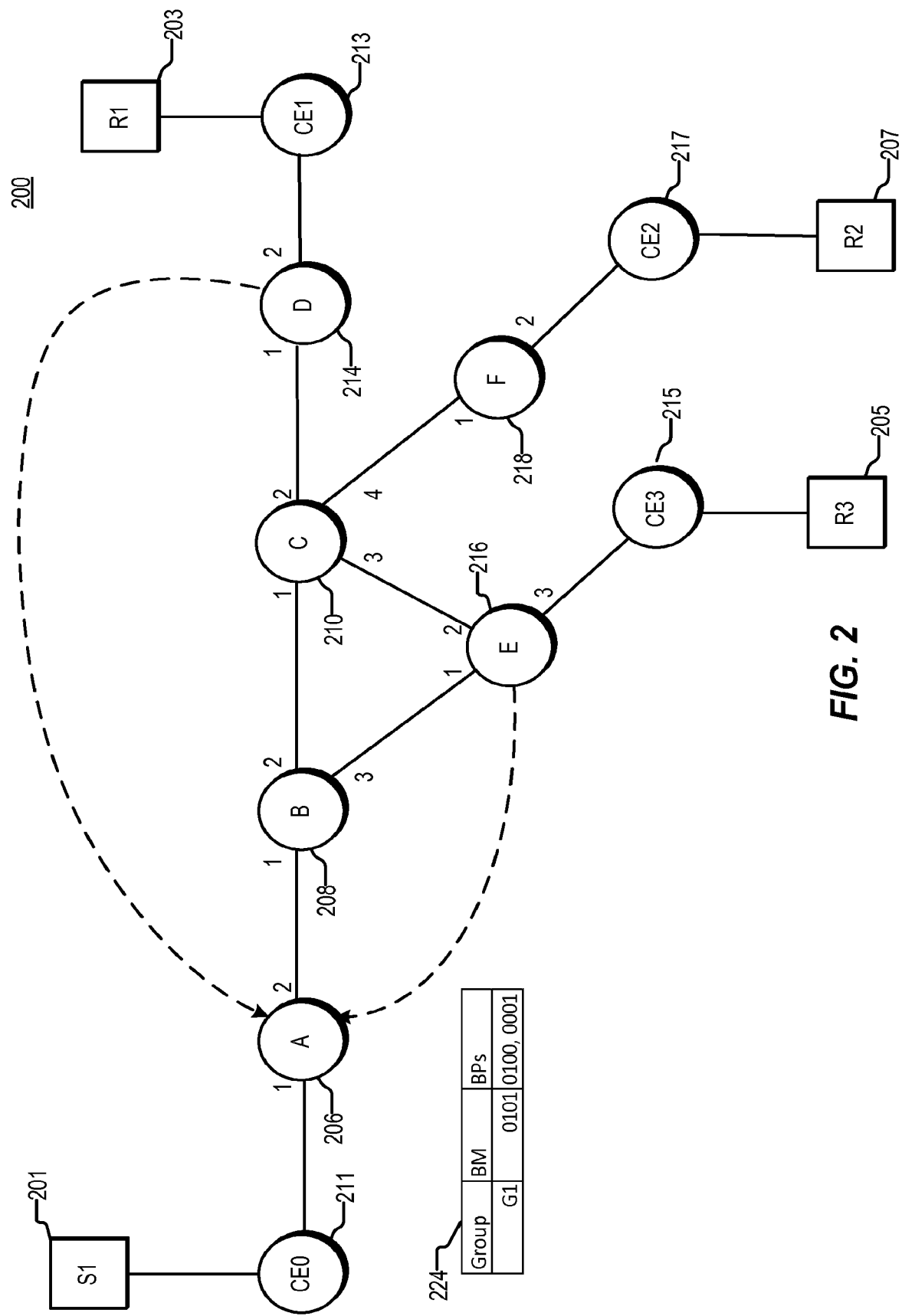
FIG. 2 is a simplified block diagram illustrating certain components of an example network.

FIG. 2 shows an example network 200. Network 200 includes BIER-enabled nodes 206-218. BIER-enabled nodes are configured to forward packets using BIER. BIER-enabled nodes 206-218 form a provider network, or domain. Such a provider network could be employed by an internet service provider to transport packets to customers. The domain includes core nodes 208 and 210, and provider edge nodes 206, 214, 216, and 218. The provider edge nodes are coupled to customer edge nodes 211, 213, 215, and 217. Hosts 201, 203, 205, and 207 are coupled to the customer edge nodes.

Each of the BIER-enabled nodes 206-218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, a prefix, or a loopback address. Each BIER-enabled node advertises or floods the routable address to all other BIER-enabled nodes in network 200. Each BIER-enabled node builds a unicast topology of the BIER-enabled nodes in network 200 using the advertised routable addresses.

BIER-enabled node 206 is configured as an ingress router (IR) for multicast data packets. The IR is coupled, via customer edge node 211, to source 201. Multicast data packets from source 201 enter the BIER network via the IR (BIER-enabled node 206). Each of BIER-enabled nodes 214, 216, and 218 is configured as an egress router (ER). The ERs can be connected (directly or via customer edge routers) to hosts, such as receivers, or other networks. An ER is a BIER-enabled node that is the last BIER-enabled node on a path between a source and a receiver. The ER may be a provider edge (PE) node that is coupled to the receiver either directly or indirectly (e.g., through a non-BIER-enabled CE node).

Assigning a Bit Position in the Bit Mask

Each ER in a BIER network is assigned a unique bit position (BP) from a bit mask (BM). As used herein, the term bit mask refers to a set of bits that has a fixed or variable length. The length of the BM used in the BIER network can be statically configured or dynamically assigned and distributed through the BIER network. In one embodiment, the length of the BM is between 256 and 1024 bits. The maximum length of the BM value is determined, in one embodiment, by hardware or software limitations of the BIER-enabled nodes in the BIER network. In one embodiment, different BIER-enabled nodes in the BIER network use different lengths for their respective BMs. For example, one BIER-enabled node may have a maximum BM length of 128 bits while another BIER-enabled node may have a maximum BM length of 256 bits. Mechanisms to handle such non-homogenous BM sizes are described below. Also described below are various approaches to accommodate BIER networks where the number of ERs exceeds the maximum number of bits in the BM. A bit mask is one type of multicast forwarding entry in which each bit position of multiple bit positions is an element that can be used to represent an individual node or interface. Other types of multicast forwarding entries with other types of entries can be used.

A bit position (BP) assigned to an ER is statically or dynamically assigned to the ER. Each ER should have at least one unique bit position from the BM. In one embodiment, a central authority, such as a controller, will assign the BPs to the ERs. The controller, in one embodiment, assigns multiple BPs to a single ER, e.g., a unique BP for each of one or more interfaces included in the ER. Other mechanisms for assigning BPs can be implemented as well, such as deriving a BP from a router identifier assigned to a BIER-enabled node, where the derivation utilizes a mapping algorithm. In some embodiments, a bit position in the BM is assigned to a single ER. In other embodiments, a single BP can be assigned to more than one ER. When multiple ERs are assigned the same BP, one of the multiple ERs can assume ownership of the BP at a given time, and ownership can be transferred between the multiple ERs. Ownership of the BP can be transferred to another one of the multiple ERs for any of several reasons, such as a failover in response to a node or link failure, or if one of the multiple ERs otherwise becomes unavailable, in response to changing network conditions, due to time-sharing considerations, and the like. Assigning one BP to multiple ERs facilitates operation similar to anycast, in which packets are forwarded to one receiver of a group of receivers, where each receiver in the group of receivers uses a common address.

Only the ERs in a BIER network are assigned a BP. All other BIER-enabled nodes in the network don't need a BP to participate in BIER. This helps to reduce the number of bits assigned in a network. As shown in the example of FIG. 2, network 200 utilizes a four bit BM. Each of the three ERs in network 200 is assigned a BP: node 214 is assigned BP {0001}; node 216 is assigned BP {0010}; and node 218 is assigned BP {0100}.

Sets

The number of ERs that can be addressed (assigned a BP) is limited by the size of the BM included in the multicast data packet. The concept of sets allows an increase in the number of ERs that can be assigned BPs. The set identifier (SI) is, for example, a number between 0 and 255. The SI allows a BP to be unique in the context of a set. For example, each BP can be reused in each set. In an embodiment with 256 sets and a BM length of 256 bits, 65536 (256×256) ERs can be supported. In one embodiment, BIER-enabled nodes in the BIER network generate separate forwarding information for each SI. For example, if two different set identifiers are in use in the BIER network, the BIER-enabled nodes generate two bit forwarding tables (BFTs), one corresponding to each SI. In response to receiving a multicast data packet having a SI, the BIER-enabled node uses the SI to select which forwarding information (e.g., BFT) to use to forward the multicast data packet.

In addition to extending the number of ERs that can be assigned unique BPs, sets can also be used in the context of multi-topology routing (MTR) or to enable temporal slicing. For example, a set of BPs can be assigned to a group of ERs. The ERs use the assigned BPs for a specified time period. A second set of BPs is also assigned to the ERs. The second set of BPs is used for a second time period. In an embodiment implemented in a dual plane network, the controller can assign one plane a first SI and the second plane a second SI. In one embodiment, BPs within a set are assigned to ERs based on geographic proximity to other ERs in the set.

A controller can determine that conditions exist to switch from forwarding packets using BPs in one set to another. For example, the controller can detect expiration of a specified time period, or receive a signal to switch between topologies in an MTR environment. In one embodiment, the controller centrally determines clustering of ERs within an aggregate collection of transported multicast flows and dynamically assigns and reassigns a SI and BP to all affected ERs. This enables a larger number of ERs to be addressed by a smaller BM. To switch sets, the controller indicates which SI and BM the IR should include in outgoing multicast data packets. Based on the SI, BIER-enabled nodes in the network will select a BFT associated with the SI, and forward multicast data packets accordingly.

In one embodiment, the SI is included as part of the BM encoding in a multicast data packet. There are a number of methods that can be used to implement sets that facilitate determining the SI from the packet. The methods vary based at least in part on the type of encapsulation used to carry the BM value. For example, if MPLS is used as the encapsulation, each SI could be implemented using a unique label. In one embodiment, if ERs that have signaled interest in a given multicast flow have different SIs, then the IR sends a copy of the multicast data packet for each SI.

The above description makes clear that a BP can be unique in the context of a domain, or BIER network, or can be unique to a given set. In one embodiment, BPs are unique within the context of a label switched path (LSP), or any other logical or physical division of a given BIER network. If a BIER network is divided into multiple LSPs, each LSP containing only a portion of the BIER-enabled nodes in the entire BIER network, assigning BPs on the basis of LSP results in being able to use a smaller number of unique BPs.

Virtual Bit Position

One way of utilizing sets uses the concept of a virtual bit position (VBP). Each ER is assigned a VBP, e.g., by a controller, as discussed above. If the number of ERs in a BIER network exceeds the maximum BM length, the BP for additional ERs is mapped to a {Set:BP} identifier. Consider an example where the BM length is 256. If 256 ERs have been assigned VBPs 1-256, the BM is used up. When another ER is assigned VBP 257, VBP 257 corresponds to {1:1}. If the BM length were 128 (instead of 256), the VBP 257 would correspond to {2:11}. One advantage of this model is that sets are automatically used to increase the number of ERs that can be uniquely identified based on the available BM size. If a longer BM size becomes available in the network, there is no need for the operator to reconfigure the ERs. The VBP and SI are signaled through the BIER network using IGP and are associated with the ER's routable address.

Advertising

In response to a BP being assigned to an ER, the ER advertises its BP along with its router identifier, to some or all of the other nodes in the BIER network. In one embodiment, the ER advertises its BP via an interior gateway protocol (IGP). For example, Intermediate System to Intermediate System (ISIS) and/or Open Shortest Path First (OSPF) can be modified to assist in distributing this information through the BIER network using link state updates. Other flooding mechanisms to distribute the information are possible. All BIER-enabled nodes in a BIER network, not just the ERs, also flood their router identifier, which is used in building network topology and unicast forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the state information maintained on a per-group basis in traditional multicast.

Figure 3A:
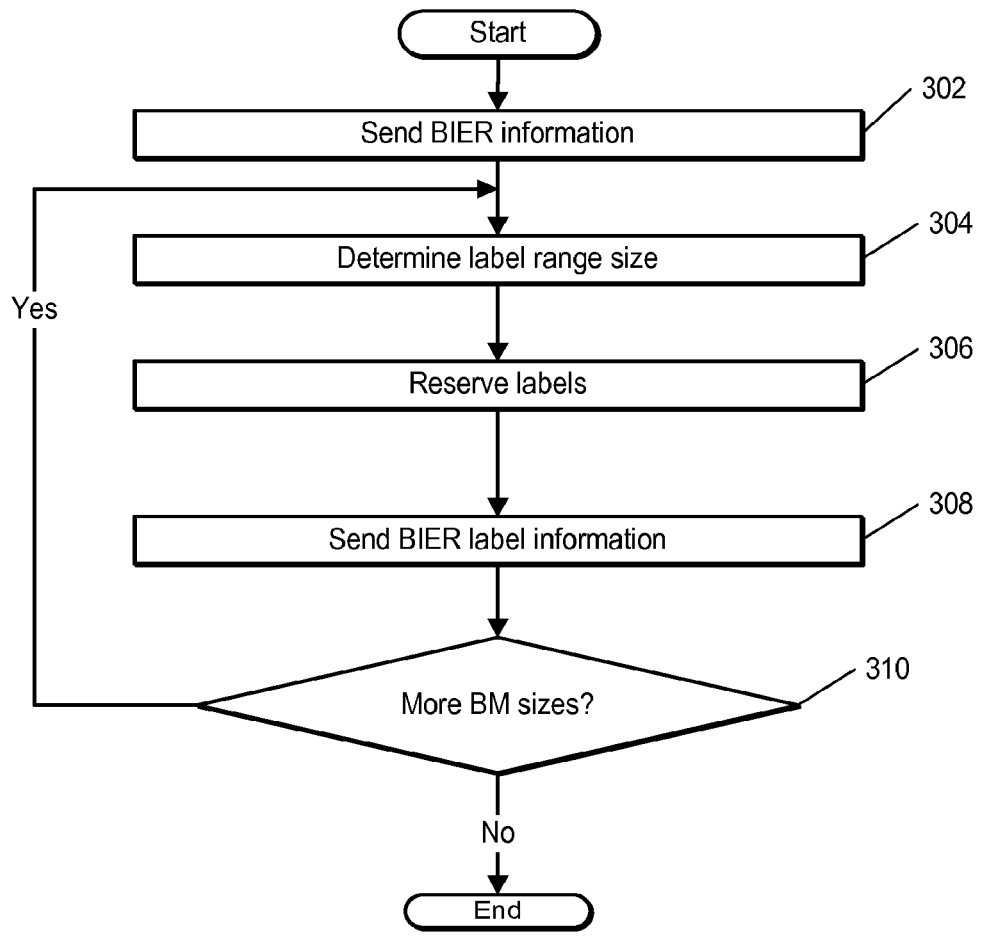
FIG. 3A is a flow chart illustrating an example process employed by a node of FIG. 2.

FIG. 3A is an example of a process performed by a BIER-enabled node, such as one of the BIER-enabled nodes of FIG. 2. The method of FIG. 3A assumes that the BIER-enabled node has already received its router identifier and in the case of an ingress router or egress router, its bit position and set identifier. At 302, the BIER-enabled node advertises its BIER information, including its router identifier, maximum bit mask size, set identifier, and bit position (if an ingress or egress router). As noted, the BIER-enabled node uses, in one embodiment, an IGP to advertise this information, such as an opaque link state advertisement (LSA) of OSPF.

At 304, the BIER-enabled node determines its label range size. In one embodiment, a network wide default value is used. That is, the BIER-enabled nodes in a BIER network can be configured by a controller or administrator to all use the same label range size, or the BIER-enabled nodes can agree by consensus to use the same label range size. The label range size corresponds to the number of sets the BIER network is configured to use. For example, the default value of 256 sets maybe used. In one embodiment, the label range size is BIER-enabled node-specific and depends on the characteristics of the BIER-enabled node, such as the BIER-enabled node's hardware capabilities. At 306, the BIER-enabled node allocates labels to be used for forwarding multicast data packets using BIER. In one embodiment, the BIER-enabled node allocates a contiguous range of MPLS labels with the number of labels in the range corresponding to the label range size. In effect, the BIER-enabled node reserves one label per set identifier.

At 308, the BIER-enabled node advertises BIER label information. In one embodiment, the BIER-label information includes the bit mask length, label range, and label range size. For example, for a bit mask length of 256 bits, and a label range size of 256 sets, the BIER-enabled node advertises one label range, which corresponds to a base label value. Based on receiving this label range value, in conjunction with the label range size, other BIER-enabled nodes in the BIER network are able to determine what labels the BIER-enabled node uses for other sets. For example, if the BIER-enabled node advertises label 20, and label range size 256, other BIER-enabled nodes can calculate that label 20 corresponds to set zero for this BIER-enabled node. Label 21 corresponds to set one for this BIER-enabled node, and so on. For each bit mask size supported by the BIER-enabled node, or each bit mask size in use in the BIER network, the BIER-enabled node advertises a separate label range. This allows BIER-enabled nodes to use label values to differentiate not only between sets, but also between bit mask sizes. For example, a BIER-enabled node can advertise label range 20 corresponding to a 4-bit BM size and label range 25 corresponding to an 8-bit BM size. In this example, label 20 corresponds to set 0 of a 4-bit BM, label 21 corresponds to set 1 of the 4-bit BM, and so on. Label 25 corresponds to set 0 of an 8-bit BM, label 26 corresponds to set 1 of the 8-bit BM, and so on. At 310, the BIER-enabled node determines whether or not it has advertised a label range for each bit mask size in use in the BIER network (as determined via the IGP advertisements) or in use on the BIER-enabled node. For example, a BIER-enabled node can determine that the BIER network includes BIER-enabled nodes using BM sizes of 128-bits, 256-bits, and 512-bits. If the BIER-enabled node can only support BMs of up to 256-bits, the BIER-enabled node advertises a label range for 128-bit BMs and 256 bit BMs. If the BIER-enabled node has not advertised a label range for each BM size, the method returns to 304. Otherwise, the method ends.

Figure 3B:
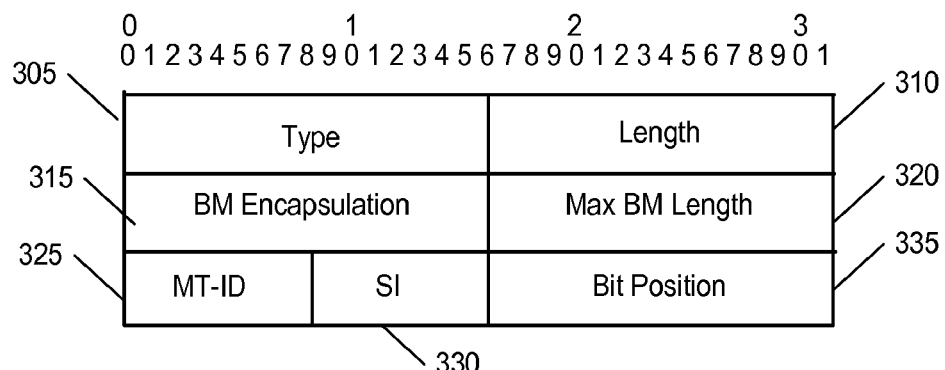
FIG. 3B is an example message transmitted by node of FIG. 2.

FIG. 3B shows an example of how advertising BIER information can be implemented using OSPF sub-TLV extensions for BIER. The BIER sub-TLV 300 includes a type field 305 and a length field 310. These fields are not BIER-specific. At 315, sub-TLV 300 includes information indicating the type of encapsulation used, e.g., for the BM. For example, the BM could be encapsulated using MPLS, IPv6, or some proprietary encapsulation, to name a few.

Sub-TLV 300 includes, at 320, a field in which the maximum bit mask length supported by the BIER-enabled node is identified. For example, if a BIER-enabled node is configured to use a maximum bit mask length of 256 bits, this information is indicated at 320. At 325, sub-TLV 300 includes a multi-topology ID. At 330, sub-TLV 300 includes a set identifier field. If the BIER-enabled node advertising sub-TLV 300 is an ER, the ER includes a set identifier associated with its BP at 330. At 335, sub-TLV 300 includes a bit position. In the case in which the BIER-enabled node advertising sub-TLV 300 is an ER, the ER advertises a bit position assigned to the ER using field 335.

When a BIER network uses MPLS, each BEIR-enabled node also advertises label information. In one embodiment, the label advertisement includes a label range, label range size, and size of the BM. Each BEIR-enabled node sends an advertisement for each BM size the BEIR-enabled node is capable of supporting or is actually using. See the figure for an example of how such advertising can be implemented using OSPF sub-TLV extensions for BIER.

Figure 3C:
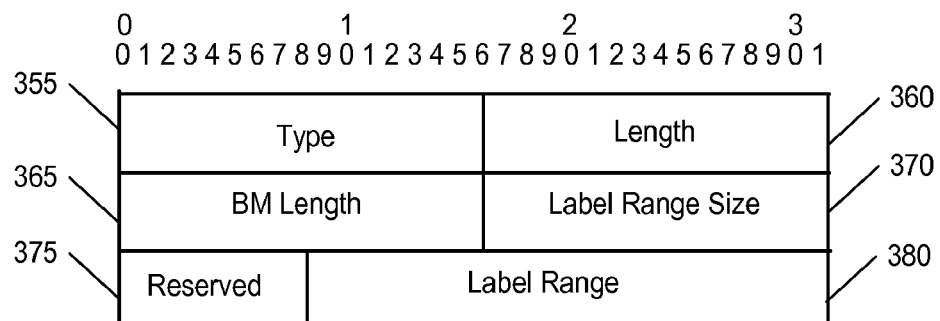
FIG. 3C is an example message transmitted by node of FIG. 2.

FIG. 3C shows a BIER label sub-TLV 350. The BIER label sub-TLV includes type field 355 and length field 360. These fields are not BIER specific. At 365, BIER label sub-TLV 350 includes information identifying the bit mask length that the advertised label range corresponds to. The label range size is advertised at 370. The label range size can be a value, such as 256, that indicates how many contiguous labels are allocated by the BIER-enabled node, or how many sets the BIER-enabled node can utilize for the BM length advertised in sub-TLV 350. As shown in FIG. 3B, the BIER label sub-TLV 350 includes a reserved field at 375. At 380, the BIER label sub-TLV 350 includes a label range field. The label range field identifies a base label value. The label value advertised in the label range field corresponds to set zero, or a default set. The label advertisement (e.g., as shown at FIG. 3C) can be sent as a single message combined with the BIER information (e.g., as shown at FIG. 3B), or separate messages can be sent.

BM Routing and Forwarding Tables

Each BIER-enabled node in the BIER network uses the BPs and router identifiers (RIDs) of the other BIER-enabled nodes to generate one or more bit routing tables (BRTs) and bit forwarding tables (BFTs). A bit routing table is a table that stores BP-to-router identifier mappings, e.g., as learned via the IGP. Each BIER-enabled node receives BP-to-router identifier mappings and stores them in a BRT. For each RID, the BIER-enabled node also includes at least one label range in the BRT. If multiple BM sizes are in use, BIER-enabled nodes advertise multiple label ranges, for example, one label range for each BM size.

Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the BP, and the interface via which the NBR is reachable. In one embodiment, the NBR is the next hop on a shortest path (SPT) towards the ER that originated the advertisement of the BP. In one embodiment, the BRT includes one entry per BP. Each entry can include multiple label ranges associated with the RID, for example, if the BIER-enabled node uses multiple BM sizes, each BM size has an associated label range.

Figure 4:
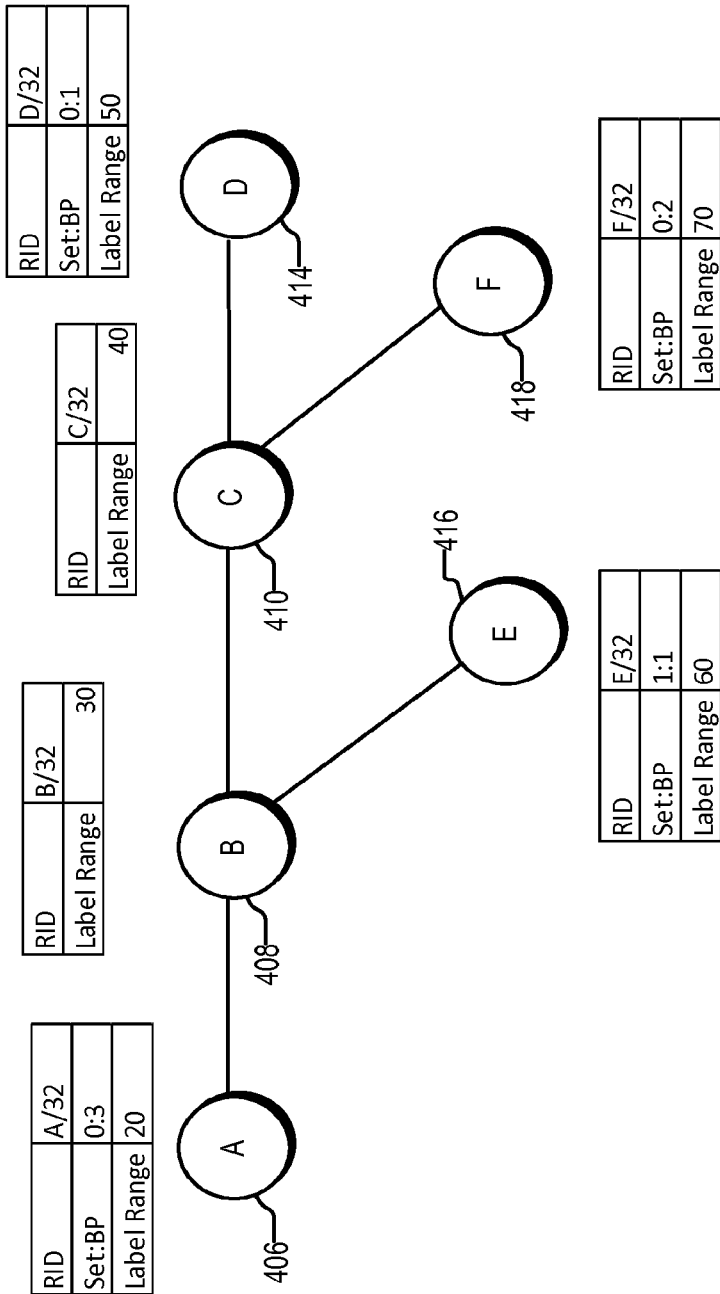
FIG. 4 is a simplified block diagram illustrating certain components of an example network.

Example BRTs and BFTs are described in the context of FIG. 4. FIG. 4 is similar to FIG. 2, in that FIG. 4 depicts an example network 400. Network 400 includes BIER-enabled nodes 406-418. BIER-enabled nodes 406-418 form a provider network, or domain. Such a provider network could be employed by an Internet service provider to transport packets to customers. The domain includes core nodes 408 and 410, and provider edge nodes 406, 414, 416, and 418. Each BIER-enabled node is assigned and advertises the RID shown. In the case of IR 406 and ERs 414, 416, and 418, the SI and BP shown are also assigned and advertised. Each BIER-enabled node also allocates and advertises the label range value shown.

BIER-enabled node 416 is shown as being assigned a BP in set 1. BIER-enabled nodes 406, 414, and 418 are in set 0. Each BIER-enabled node has allocated a label range such that each set has its own label. If BIER-enabled node 406 forwards a multicast data packet having one or more BPs set for BPs in set 0, BIER-enabled node 406 uses label 20. If BIER-enabled node 406 forwards a multicast data packet having one or more BPs set for BPs in set 1, BIER-enabled node 406 uses label 21. In this example there are two sets (0 and 1). If there were a third set, e.g., an ER had been assigned a BP in set 2, BIER-enabled node 406 would use label 22 for BPs in set 2. In one embodiment, each BIER-enabled node allocates a contiguous range of labels, e.g., 256 labels, to accommodate a set length used by some or all of the BIER-enabled nodes in the network. In the example of FIG. 4, we assume the BM length is the same on all BIER-enabled nodes.

Figure 5A:
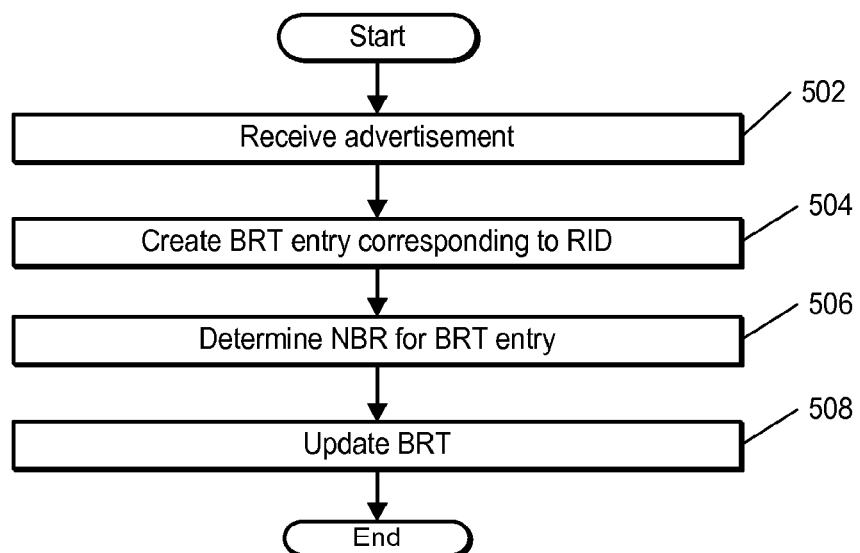
FIG. 5A is a flow chart illustrating an example process employed by a node of FIG. 4.

FIG. 5A shows an example of constructing and updating a bit routing table. In one embodiment, the method shown in FIG. 5A is performed by BIER-enabled node, such as one of the BIER-enabled nodes of FIG. 4. At 502, the BIER-enabled node receives an advertisement. In one embodiment, the advertisement includes a label range value and a prefix or router ID corresponding to the BIER-enabled node that originated the advertisement. If the BIER-enabled node that originated the advertisement is also an IR or an ER, the advertisement also includes information identifying a bit position and a set identifier. At 504, the BIER-enabled node that received the advertisement creates an entry in its bit routing table corresponding to the router ID from the advertisement. At 506, the BIER-enabled node determines the identity of neighbor that should be included in the entry corresponding to BP. Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the RID. The neighbor is a next hop BIER-enabled node along the shortest path towards the BIER-enabled node that originated the advertisement, that is, the BIER-enabled node corresponding to the router ID. At 508, the BIER-enabled node has information identifying the neighbor to the entry in the bit routing table.

Using the example BIER network of FIG. 4, FIGS. 5B and 5C show BRTs constructed by BIER-enabled nodes 406 and 408, respectively. As shown in FIG. 5B, BIER-enabled node 406 constructs a bit routing table 500. Bit routing table 500 includes a column for router ID, as shown at 502. The router ID, in one embodiment, is a prefix assigned to each BIER-enabled node. BRT 500 also includes a column 504 for information identifying the set and bit position associated with the BIER-enabled node identified in the router ID column. At 506, bit routing table 500 includes a column for information identifying a label range associated with (e.g., advertised by) each of the BIER-enabled nodes identified in the router ID column. Bit routing table 500 also includes, at 508, a column for the neighbor. The neighbor column identifies the BIER-enabled router that is next on a path between node 406 and the BIER-enabled node identified in the RID column of the bit routing table. For example, as shown in FIG. 4, the next hop BIER-enabled node between BIER-enabled node 406 (A/32) and BIER-enabled node 414 (D/32), is BIER-enabled node 408 (B/32).

FIG. 5C shows a bit routing table for BIER-enabled node 408. Bit routing table 520, similar to bit routing table 500, includes a column 522 that includes information identifying the router IDs for each BIER-enabled node in the BRT. Bit routing table 520 includes, at 524, information identifying a set ID and bit position of the BIER-enabled node identified in the router ID column. At 526, bit routing table 520 includes a label column that includes information identifying the label range used by each of the routers identified in column 522. At 528, bit routing table 520 includes a column with information identifying the next hop BIER-enabled node along a shortest path from the BIER-enabled node that generated the BRT (BIER-enabled node 408) towards the BIER-enabled node whose router ID is included in column 522.

Figure 6A:
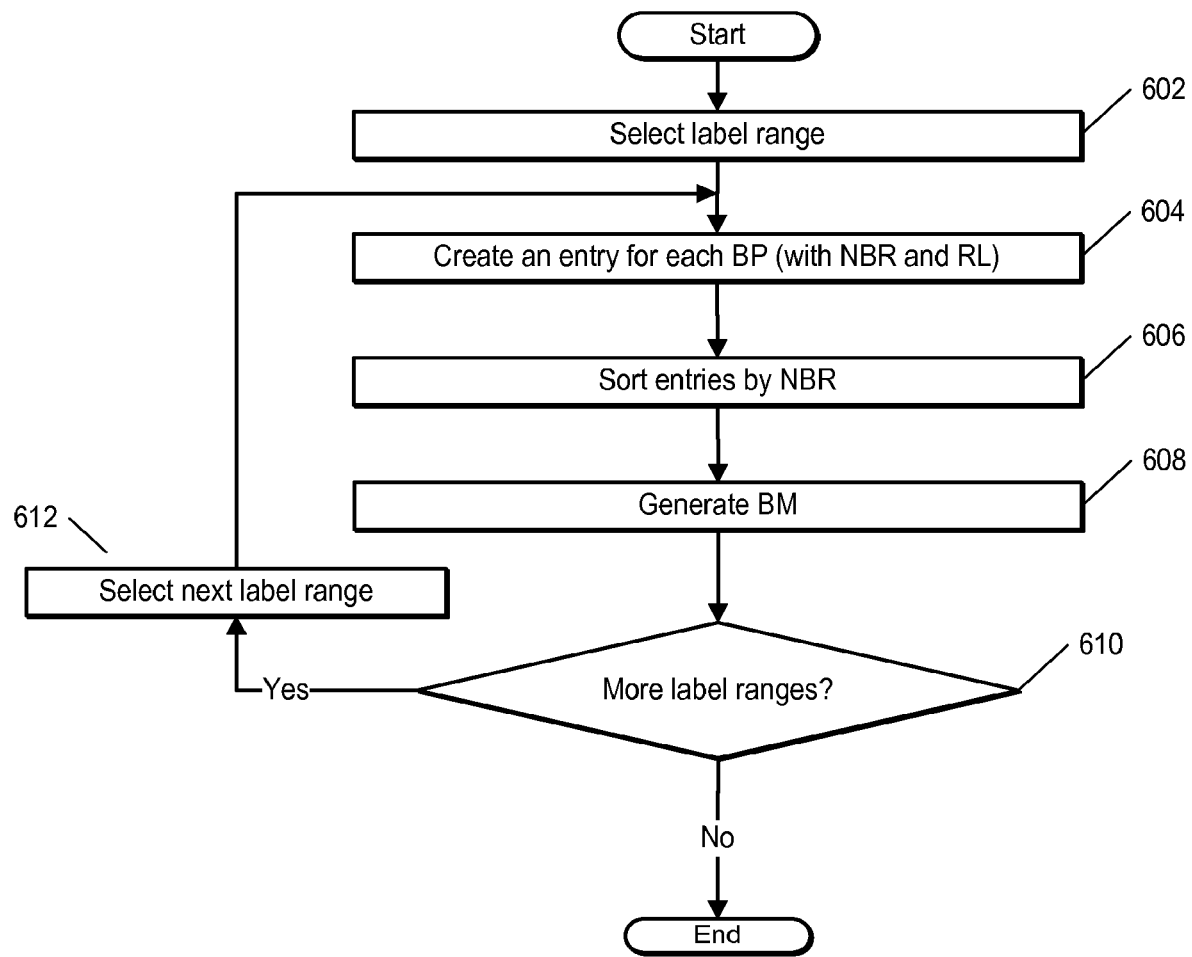
FIG. 6A is a flow chart illustrating an example process employed by a node of FIG. 4.

Each BIER-enabled node translates its BRT(s) into one or more bit forwarding tables (BFTs). FIG. 6A shows an example of constructing and updating a bit forwarding table. In one embodiment, the method shown in FIG. 6A is performed by BIER-enabled node, such as one of the BIER-enabled nodes of FIG. 4. At 602, the BIER-enabled node selects a label range. If there are multiple BM sizes in use, there may be multiple label ranges advertised by the BIER-enabled node. For each label range, there can be multiple label values corresponding to multiple sets. At 604, the BIER-enabled node creates an entry for each BP associated with the label range. For example, if a BM is 256 bits long, and each of the 256 BPs in the BM is assigned to an ER, the BIER-enabled node creates 256 entries. In one embodiment, each entry includes information identifying a NBR on the shortest path between the BIER-enabled node and the ER corresponding to the BP. The BIER-enabled node uses information from the BRT to identify the NBR. The entry also includes a remote label for the NBR. In one embodiment, the remote label is advertised by the NBR. The BIER-enabled node determines a set identifier associated with the label range, and selects a corresponding label for the NBR. That is, if BFT entries for a label range corresponding to set 0 are being created or updated, the BIER-enabled node selects a remote label for the NBR that corresponds to set 0. In one embodiment, this involves calculating a remote label based on a label range value advertised by the NBR.

In one embodiment, the BIER-enabled node sorts the entries for the label range by BP at 606. At 608, the BIER-enabled node generates a BM for each entry. Generating the BM involves setting a corresponding bit in the BM for each ER that is reachable via the NBR identified in the entry. In one embodiment, the BIER-enabled node performs an OR operation between BMs that have a single bit set, the set bit corresponding to an ER reachable via the NBR. If multiple BFT entries have the same NBR, they will have identical BMs in the BFT entries. At 610, the BIER-enabled node determines whether there are additional label ranges. For example, if the BIER-enabled node uses multiple BM sizes, the BIER-enabled node updates the BFT (or creates a new BFT) to include information for each BM size. If there are additional label ranges, the BIER-enabled node selects the next label range at 612, and the method returns to 604.

FIG. 6B shows a bit forwarding table 640. In one embodiment, BFT 640 is created by BIER-enabled node 406 of FIG. 4. BFT 640 includes column 642, which includes information identifying local labels, e.g., labels used by the BIER-enabled node that created the BFT (BIER-enabled node 406 in the example of FIG. 6B.) The local label column 642 includes a local label for each set in which bit positions have been assigned. In the case of FIG. 6B, set 0 (which corresponds to local label 20) and set 1 (which corresponds to local label 21) are in use by BIER-enabled node 406. FIG. 6B also includes, at 644 a bit position column. For each local label, each bit position that has been assigned to an ER has an entry. Column 646 includes information identifying a bit mask which will be included in multicast data packets sent out from BIER-enabled node 406, those multicast data packets being intended to reach the egress routers corresponding to the bits indicated in bit position column 644. At 648, information identifying the neighbor along the shortest path towards the egress router corresponding to the BP identified in column 644 is included.

BFT 640 also includes a remote label column 650. The BIER-enabled node that maintains the forwarding table, in this case, BIER-enabled node 406, inserts the label identified in column 650 into a multicast data packet's header and then forwards the multicast data packet along the shortest path towards the neighbor identified in the corresponding BFT entry.

Similar to bit forwarding table 640 of FIG. 6B, bit forwarding table 660 of FIG. 6C includes information used by a BIER-enabled node to forward multicast data packets. In one embodiment, BFT 660 is created by BIER-enabled node 408 of FIG. 4. Bit forwarding table 660 includes a local label column 662, a bit position column 664, a bit mask column 665, a neighbor column 668, and a remote label column 670.

In the example of FIG. 6C, in response to receiving a multicast data packet with local label 30 (corresponding to set 0), a BIER-enabled node determines how to forward the packet. Since ERs corresponding to bit position 1 (SI:BP equal to 0:1) and bit position 2 (SI:BP equal to 0:2) are reachable via C, the corresponding BPs are aggregated to form BM 0011, which the BIER-enabled node puts in the BFT entries corresponding to C. The aggregation involves, in one embodiment, performing a logical OR operation between a BM that has only the BP corresponding to the respective ER set. The ER corresponding to bit position 3 (SI:BP equal to 0:3) is reachable via A. The corresponding bit is set in the BM of the BFT. For set 1 (label 31), the ER corresponding to bit position 1 (SI:BP equal to 1:1) is reachable via E.

Bit Mask Encoding

When a receiver (e.g., a host, such as host 203 of FIG. 2) wishes to join a multicast group, the receiver sends a message (e.g., using IGMP) to the BIER-enabled ER the receiver is coupled to (either directly or indirectly). In response to receiving a message indicating a receiver wishes to join a multicast group, the ER signals its interest in the multicast group identified in the message. This involves, in one embodiment, the ER sending a signaling message to any IRs in the network, or to a controller, indicating the ER's interest in the multicast group and including the ER's BP. Transmission of the signaling message is represented by the dashed line in FIG. 2.

An IR, such as BIER-enabled node 206 of FIG. 2, maintains state information that includes an entry for each multicast group that the IR receives multicast data packets for. In one embodiment, the IR maintains the state in a group membership table (GMT), as shown at 224 of FIG. 2. In one embodiment, each entry includes information identifying the multicast group (such as a multicast group name and/or an address of a source for the multicast group), a list of BPs corresponding to ERs that have expressed interest (e.g., via a signaling message) in the multicast group identified in the group field, and a BM, which identifies all of the ERs that have expressed interest in the multicast group (e.g., by having a bit set in the bit position corresponding to each ER that has expressed interest in the multicast group). In response to receiving a multicast data packet, the IR encapsulates the BM into the multicast data packet and forwards the multicast data packet into the BIER network.

In one embodiment, the BM is encoded as a stack of labels. Given that the BM is, in some embodiments, relatively long, e.g., 256 bits, and that MPLS labels are 32 bits long, encoding the BM as a stack of labels uses a large number of labels. An alternate encoding, shown in FIG. 7A, involves encoding the BM between the MPLS header and the IP header of a multicast data packet 700. Multicast data packet 700 includes an MPLS label stack. The first label in the MPLS label stack is the top label 702. The last label in the MPLS label stack is the bottom label 704. Between the top label and the bottom label the MPLS header may include additional labels. After the MPLS header, a bit mask 706 is included in the multicast data packet. Following the bit mask, is a payload 708. In one embodiment, payload 708 includes an IP header and IP payload data.

Figure 7A:
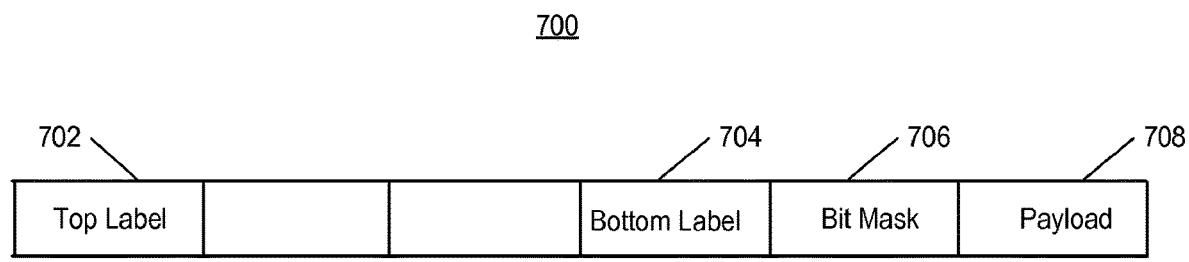
FIG. 7A is an example packet format.
Figure 7B:
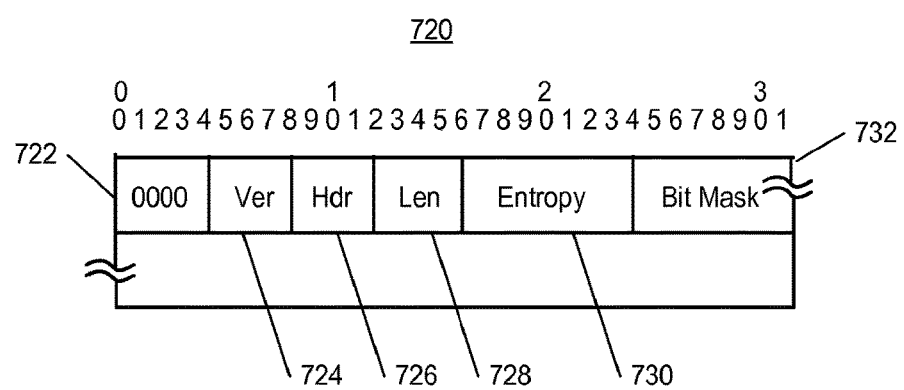
FIG. 7B is an example bit mask encoding.

FIG. 7B shows an example encoding of a bit mask, according to one embodiment. The bit mask shown at 720 can correspond to bit mask 706 of FIG. 7A. The first four bits of the bit mask, at 722, are set to all zeros. This indicates that the bit mask is not an IP packet. The second field, 724, is a four bit version field. The version field can be used to extend the encoding and introduce new functionality. For example, the bit mask may be encoded in multiple ways. The version field can be used to differentiate between the various types of encoding. The third field in the bit mask is a header field at 726. The header field indicates if an optional header follows the bit mask, such as an extension header. In one embodiment, the header field includes information that identifies a protocol of the information that follows the BM. For example, the protocol information can indicate that an MPLS label stack follows the BM, IP payload, or the like. The fourth field, 728, is a length field. The length field indicates the length of the bit mask. The length of the bit mask is known, since each local label is associated with a bit mask length. In one embodiment, the value of the length field encodes the length of the bit mask. For example, if the value of the length field is zero, the length of the bit mask is 64 bits. If the value of the length field is one, the length of the bit mask is 128 bits, and so on. Providing the length of the bit mask in the length field, improves security. That is, a BIER-enabled node can check if the bit mask length identified in the length field matches the bit mask length expected based on the value of the local label. The next field is a 16-bit entropy field at 730. The entropy field is used for load balancing. The bit mask itself is located at 732.

Figure 7C:
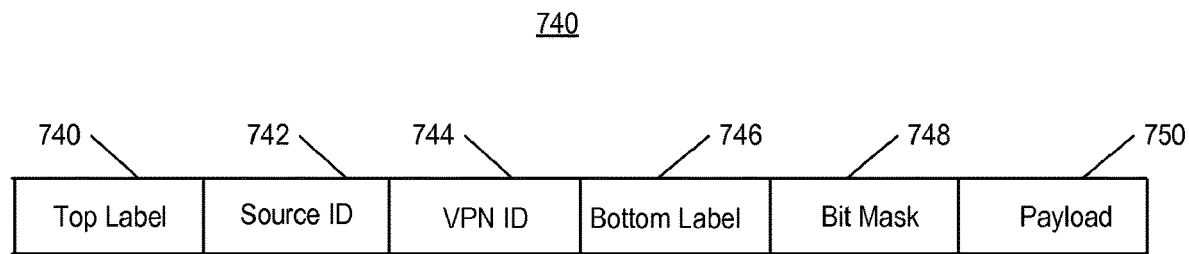
FIG. 7C is an example packet format.

FIG. 7C shows an option to encode information identifying a source IR and information identifying a virtual private network (VPN-ID) using labels. With BIER there is no VPN or source IR context that can be derived from the top label of a multicast data packet. The top label identifies the SI the multicast data packet belongs to. The top label does not have any VPN or source IR context because there is no multicast data tree per VPN or IR. The mechanism described below is used to provide this context and transport multicast VPN traffic in a BIER network.

Traditionally, if a multicast data tree is used to aggregate VPNs, the VPN context is stored in the multicast data packet sent along the multicast data tree. This enables a receiver to determine which VPN a particular multicast data packet is associated with. One embodiment uses an upstream assigned label allocated by the IR and included in the label stack. An upstream assigned label is unique in the context of the IR that assigns the label. The receiving ER maintains state information identifying which IR is associated with the upstream assigned label. However, if there is no multicast data tree associated with the IR, the ER has no way to determine which IR is associated with the upstream assigned label and instead. To overcome this, VPN and source IR context are carried in the multicast data packet using a VPN and source IR index value.

For the source IR context we use the Virtual Bit Position (VBP). A 16-bit VBP enables unique identification of 65,536 source IRs. The VPN-ID is a 16-bit identifier that identifies a multicast VPN (mVPN) globally throughout the BIER network. The VPN-ID is encoded in a similar way to the Source-ID. The VPN-ID is configured on each BIER-enabled node that participates in the mVPN.

Similar to the multicast data packet shown in FIG. 7A, the multicast data packet 740 shown in FIG. 7C includes a top label at 740, a bottom label at 746, a bit mask at 748, and payload at 750. In addition, multicast data packet 740 includes in its MPLS label stack a label 742 which identifies a source IR. Multicast data packet 740 also includes a label 744 which includes a VPN-ID. Encoding the source IR and VPN context in labels has a consequence that core nodes that forward multicast data packets based on the BM skip over at least 4 labels before they get to the BM. This represents an unwelcome burden on the core nodes since the source-ID and VPN-ID are only relevant to the ERs. Furthermore, it is beneficial to have the BM value as close to the top label as possible. Therefore, in another embodiment, the source-ID (which identifies the source IR) and VPN-ID are encoded in a BIER VPN extension header, as described below.

Figure 7D:
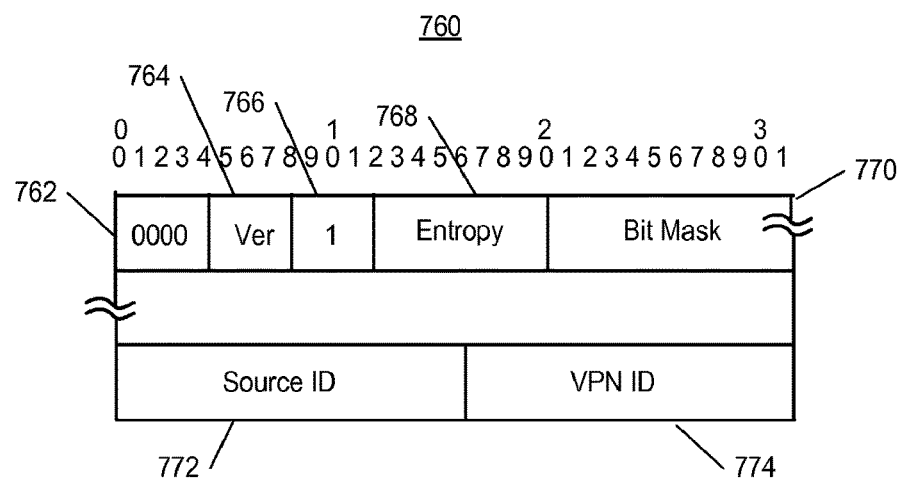
FIG. 7D is an example bit mask encoding.

FIG. 7D shows an option to encode information that identifies a source IR and VPN-ID using an extension header. FIG. 7D shows an extension header 760. Extension header 760 includes a first field 762. The first field is set to zeros to indicate that the extension header does not represent the beginning of an IP payload. Extension header 760 also includes a version field 764. The version field can be used to differentiate between various encoding methods. At 766, a header value of 1 is defined. A header value of 1 indicates that the extension header includes a 32-bit value. The 32-bit value is divided between a 16-bit source ID at 772, and a 16-bit VPN ID at 774. The source ID and VPN ID follow the bit mask 770 and entropy field 768.

Packet Forwarding

BIER-enabled nodes forward multicast data packets to one or more other BIER-enabled nodes using BFTs and one or more labels attached to the multicast data packets. An example method of forwarding a multicast data packet is described with regard to FIG. 8. The method of FIG. 8 can be performed by a BIER-enabled node, such as one of the BIER-enabled nodes of FIG. 4. At 802, the BIER-enabled node receives a multicast data packet. The multicast data packet can be received from another BIER-enabled node, or from a host, e.g., via a customer edge node. In one embodiment, the multicast data packet includes an MPLS header, which includes a top label.

At 804, the BIER-enabled node determines whether the top label is associated with a BIER-enabled node. The top label indicates whether the multicast data packet should be forwarded using the BIER-enabled node's BFT. If the top label is associated with a BIER-enabled node, e.g., if the top label was received in a BIER label advertisement, the top label will have an entry in the BIER-enabled node's BFT. In response to determining that the top label is not associated with a BIER-enabled node, the BIER-enabled node performs alternate processing, as shown at 826. In one embodiment, this involves popping the top label off of the multicast data packet's MPLS label stack and then returning to 804 to determine if the new top label of the MPLS label stack is associated with a BIER node. In one embodiment, alternate processing at 826 involves the BIER-enabled node dropping the multicast data packet.

If the top label of a multicast data packet is associated with a BIER node, as determined at 804, the BIER-enabled node uses the top label to select a BFT (or a portion of a BFT) associated with the top label. At 808, the BIER-enabled node selects the first bit of the bit mask included in the multicast data packet, referred to as packet bit mask or PBM. At 810, the BIER-enabled node determines whether the selected first bit of the PBM is set. If the BIER-enabled node determines that the selected first bit of the PBM is not set, the BIER-enabled node determines, at 822, whether the PBM includes more bits. If the BIER-enabled node determines that the PBM does include more bits, the BIER-enabled node selects the next bit of the PBM and the method returns to 810, where the BIER-enabled node determines whether the selected next bit is set.

In response to determining that the selected bit is set, the BIER-enabled node determines, at 814, whether a neighbor associated with the bit position corresponding to the selected bit is a BIER-enabled node. In one embodiment, this involves the BIER-enabled node determining, using the bit forwarding table, the identity of the neighbor. For a given label and a given BP, the BIER-enabled node can determine the identity of the neighbor to which the multicast data packet should be forwarded. The BIER-enabled node determines whether the neighbor is a BIER-enabled node, using information advertised by the neighbor. For example, if the neighbor is a BIER-enabled node, the BIER-enabled node will have received an advertisement including BIER information from the neighbor, e.g., a label range value received via the IGP.

Figure 9:
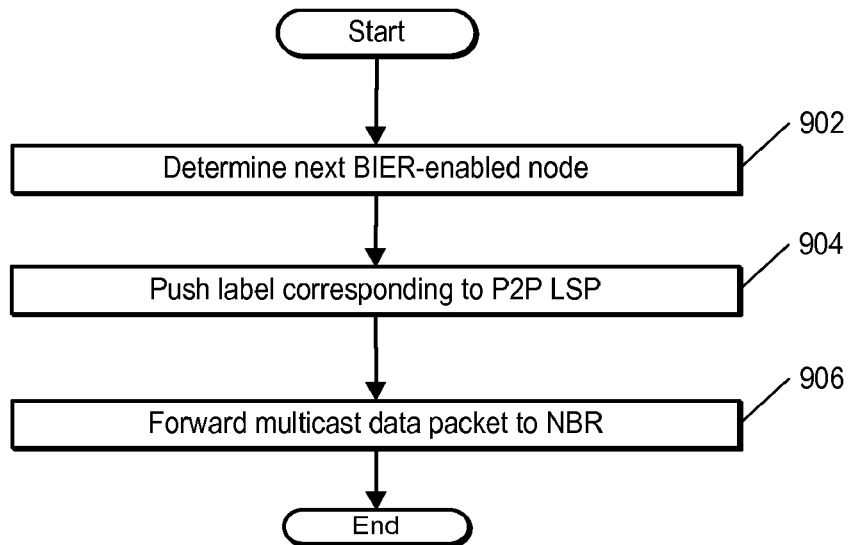
FIG. 9 is a flow chart illustrating an example process employed by a node of FIG. 4.

If the BIER-enabled node determines that the neighbor is not a BIER-enabled node, the BIER-enabled node performs a tunneling operation at 812, as described with regard to FIG. 9. The tunneling operation enables the multicast data packet to be forwarded through or around the non-BIER-enabled node.

If the BIER-enabled node determines that the neighbor is a BIER-enabled node, the BIER-enabled node creates a copy of the multicast data packet received at 802, and updates the packet bit mask of the copy of the multicast data packet at 816. In one embodiment, updating the PBM in the copy of the multicast data packet involves performing an AND operation between the PBM and the bit mask in the forwarding table entry that corresponds to the selected bit. The resulting value is used as the PBM for the copy of the multicast data packet. The BIER-enabled node then updates the copy of the multicast data packet by removing the multicast data packet's top label (e.g., the label that was on top of the multicast data packet's MPLS label stack when the packet was received by the BIER-enabled node) and attaching the label corresponding to the neighbor to which the multicast data packet is being forwarded. This value is determined using the BIER-enabled node's BFT. At 818, the BIER-enabled node forwards the multicast data packet to the neighbor indicated by the BFT.

At 820, the BIER-enabled node updates the PBM of the multicast data packet received at 802 by clearing those bits in the multicast data packet's PBM that correspond to the bits which were set in the multicast data packet that the BIER-enabled node forwarded. In one embodiment, this involves performing an AND operation between the PBM in the received multicast data packet, and the inverse of the BM in the entry corresponding to the selected bit. This has the effect of clearing those bits that correspond to bit positions which were set in the PBM of the outgoing packet, which prevents looping and duplication. The BIER-enabled node determines, at 822, whether the packet bit mask includes more bits, or whether the end of the packet bit mask has been reached. If the last bit of the packet bit mask has not been reached, the method returns to 810, after selecting a next bit at 824. The BIER-enabled node then continues to walk to the PBM of the received multicast data packet, bit-by-bit, until the end of the PBM is reached.

Consider the following example, which illustrates the method described above of forwarding a multicast data packet. In this example, a multicast data packet arrives at node B (e.g., 408 of FIG. 4) having a packet bit mask (PBM) of 0110, and a top label of 30. Node B uses the BFT 660 shown in FIG. 6C.

Figure 8:
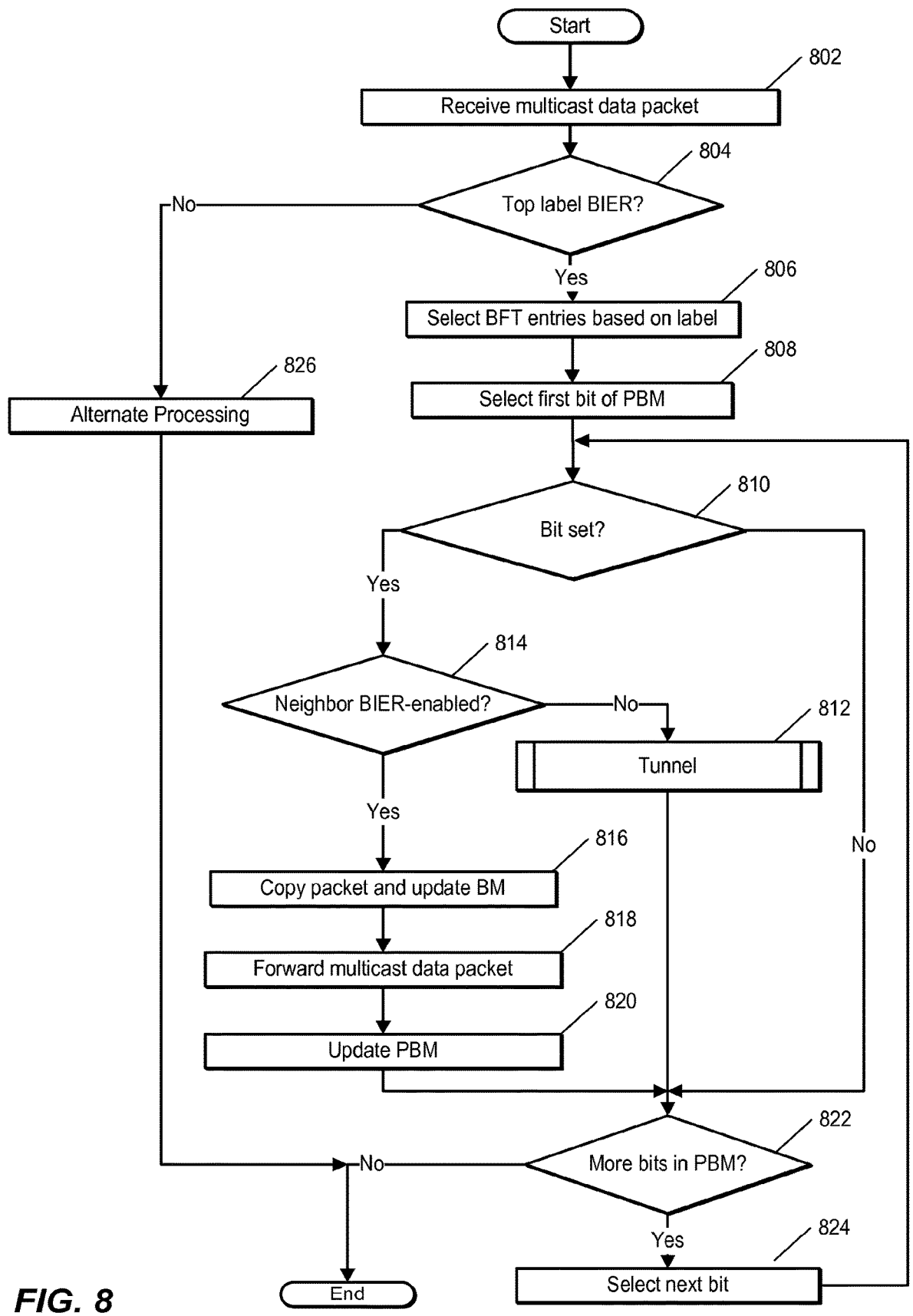
FIG. 8 is a flow chart illustrating an example process employed by a node of FIG. 4.

In accordance with 804 of FIG. 8, node B determines whether the top label in the received multicast data packet's MPLS label stack is associated with a BIER-enabled node. Node B is able to determine, based, for example, on advertisements received via the IGP, that the top label (30) is associated with node B, which is a BIER-enabled node. The method proceeds according to 806 of FIG. 8, and node B selects that portion of its bit forwarding table which corresponds to local label 30. Node B selects, in accordance with 808 of FIG. 8, a first entry of the packet bit mask of the received multicast data packet. The first bit of the packet bit mask (0110) is not set. Node B then determines whether more bits are included in the PBM. Since this was bit 1, there are still bits 2, 3, and 4 in the PBM.

Node B selects bit 2 and determines whether bit 2 is set. Node B determines that bit 2 is set. As indicated in bit forwarding table 660, the ER that corresponds to bit 2 of the set that corresponds to local label 30 is reachable via neighbor C. Node B determines that neighbor C is a BIER-enabled node, e.g., based on advertisements received via the IGP. Therefore, node B creates a copy of the received multicast data packet. Node B then updates the bit mask in the copy of the packet by performing a logical AND operation using the BM in the copy of the multicast data packet, which is 0110 and the bit mask in the entry corresponding to bit position 2, which is 0011. The result of the AND operation is 0010. Node B updates the bit mask of the copy of the multicast data packet to 0010. Node B also swaps top label 30 for remote label 40, which is associated with set 0 of neighbor C, and forwards the copy of the multicast data packet to neighbor C.

Next, node B updates the packet bit mask of the received multicast data packet by performing a logical AND operation between the packet bit mask of the received multicast data packet with the inverse of the entry used to forward the copy of the multicast data packet. The inverse of the BM in the entry used to forward the copy of the multicast data packet, which was 0011, is 1100. When 1100 is ANDed with the packet bit mask of the received multicast data packet (0110), the result is 0100. Node B updates the packet bit mask of the received multicast data packet to be 0100.

Node B determines whether more bits are included in the packet bit mask of the received multicast data packet. Since the previous bit was bit 2, there are bits 3 and 4 in the PBM, and node B selects bit 3, in accordance with 824 of FIG. 8. Node B determines that bit 3 is set. Node B then determines that bit 3 corresponds to neighbor A, which is a BIER-enabled node. Therefore, node B creates a copy of the received multicast data packet (with updated packet bit mask) and updates the bit mask in the copy of the received multicast data packet, in accordance with 816 of FIG. 8. This involves performing a logical AND between the bit mask in the copy of the multicast data packet (0100) which the bit mask in the entry corresponding to bit position 3, which is 0100. The result is 0100. Node B updates the packet bit mask in the copy of the multicast data packet to read 0100, swaps the incoming top label of 30 with the remote label corresponding to neighbor A, which is 20 and forwards the copy of the multicast data packet to node A.

Node B then updates the packet bit mask of the received multicast data packet, which is 0100, by ANDing that value (0100) with the inverse of the entry corresponding the current bit position, which is bit position 3. The entry corresponding to bit position 3 is 0100. The inverse of 0100 is 1011. When 1101 is ANDed with 0100, the result is 0000. Node B updates the packet bit mask of the received multicast data packet with this value (0000). Node B then determines whether there are more bits included in the packet bit mask. Since there is one more bit, bit 4, node B selects that bit and determines whether or not the bit is set, in this case, the bit is not set, so node B checks whether more bits are included in the packet bit mask of the received multicast data packet. Since bit 4 is the last bit is included in the packet bit mask of the received multicast data packet, the method ends.

FIG. 9 shows additional details of performing a tunnel operation, in accordance with 812 of FIG. 8. In response to a BIER-enabled node, such as one of the BIER-enabled nodes of FIG. 4, determining that its directly connected next-hop neighbor along the shortest path towards an egress router is not a BIER-enabled node, and that the BIER-enabled node intends to forward a multicast data packet along that shortest path, the BIER-enabled node can use point-to-point label switched paths to essentially tunnel through the non-BIER-enabled node.

In one embodiment, tunneling through a non-BIER-enabled node involves determining, as shown at 902, the next BIER-enabled node along the shortest path towards the egress router. If only a single non-BIER-enabled node is present along the shortest path to the ER, a P2P LSP is used to traverse the single node. If multiple non-BIER-enabled nodes are present, the rP2P LSP traverses the multiple non-BIER-enabled nodes. If no further BIER-enabled nodes exist along the shortest path, the BIER-enabled node utilizes a P2P LSP to the ER.

At 904, the BIER-enabled node pushes a label corresponding to a P2P LSP onto the multicast data packet. The BIER-enabled node forwards the multicast data packet to the non-BIER-enabled neighbor at 906. The non-BIER-enabled neighbor, in response to receiving the multicast data packet, pops the top label. If there is a single intervening non-BIER-enabled node, the non-BIER-enabled node determines that the next hop is the last hop along the P2P LSP. The non-BIER-enabled node forwards the multicast data packet to the next hop. In this case, the next hop is a BIER-enabled node, which resumes forwarding the multicast data packet using the BIER label which is now at the top of the MPLS label stack and the bit mask included in the multicast data packet. If there is more than one intervening non-BIER-enabled node, the first of the non-BIER-enabled nodes pushes the next label associated with the P2P LSP onto the multicast data packet's MPLS label stack. The multicast data packet is forwarded along the P2P LSP using unicast MPLS until the last non-BIER-enabled node pops the top label and forwards the multicast data packet on to a BIER-enabled node without inserting a new non-BIER label.

In one embodiment, the BIER-enabled node determines the final destination, e.g., the ER associated with a BP. In response to determining the ER, the BIER-enabled node uses a P2P LSP to forward the multicast data packet to the ER. This involves the multicast data packet traversing any nodes (whether BIER-enabled or not) hop-by-hop until the multicast data packet reaches the ER. Each of the nodes along the P2P LSP forwards the multicast data packet using the labels associated with the P2P LSP. None of the nodes performs replication or forwarding based on the BM in the multicast data packet. To overcome this, the BIER-enabled node sends a copy of the multicast data packet to any other ERs identified by the BM. That is, for each bit set in the BM, the BIER-enabled node sends a copy of the multicast data packet to the corresponding ER using a P2P LSP for each ER.

Using an Existing Loop-free Topology

In order to prevent looping or packet duplication, a BIER-enabled node resets bits in the BM when forwarding a packet. In one embodiment, BIER-enabled nodes can forward multicast data packets using inherently loop-free topologies. In this case, there is no risk of looping, so there is no benefit to resetting the bits. One example of such a loop-free topology is a point-to-multipoint label switched path (P2MP LSP). When using a P2MP LSP to forward multicast data packets, BIER-enabled nodes, in one embodiment, do not modify the BM. In response to detecting that a loop-free topology is in use, the BIER-enabled nodes forward the multicast data packet from IR to ER without modifying the BM in the multicast data packet.

Figure 10:
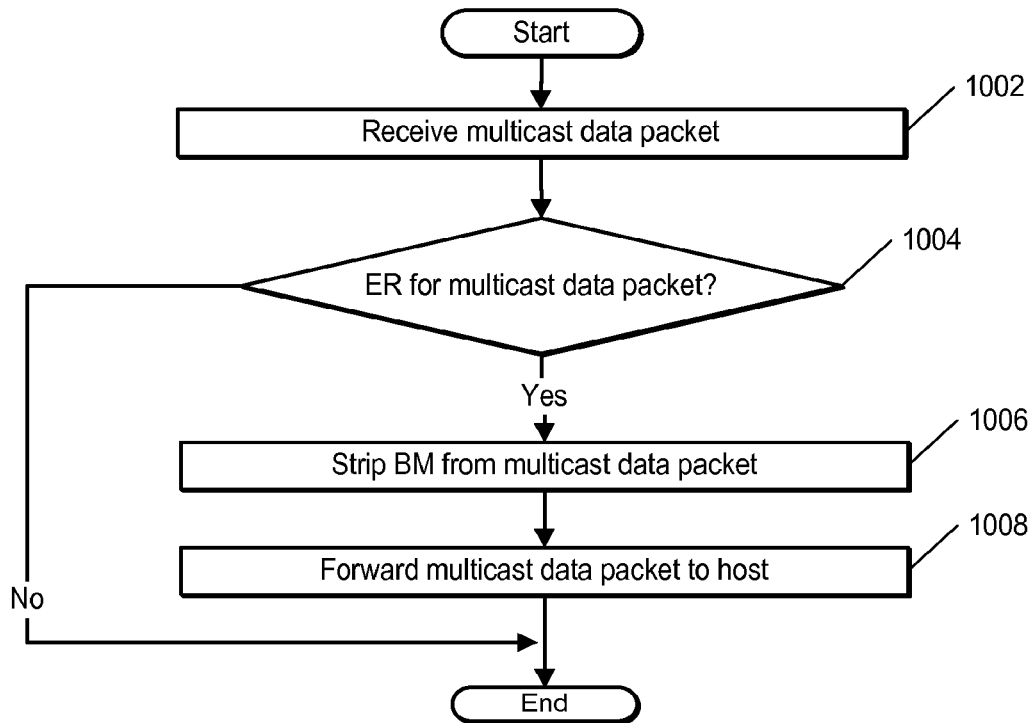
FIG. 10 is a flow chart illustrating an example process employed by a node of FIG. 4.

FIG. 10 is a flowchart showing an example process performed by a BIER-enabled node in a BIER network. In one embodiment, the method is performed by an egress router (ER), such as BIER-enabled node 414 of FIG. 4. At 1002, the ER receives a multicast data packet associated. At 1004, the ER determines whether the ER is an ER for the multicast data packet, e.g., that a receiver for the multicast data packet is connected (directly or indirectly) to the ER. In one embodiment, determining whether the ER is an ER for the multicast data packet involves the ER comparing its assigned BP with the BM of the incoming multicast data packet. For example, the ER can perform an AND operation between the incoming multicast data packet's BM and a BM having only the BP corresponding to the ER set. If the BP corresponding to the ER is set to 1 in the result of the AND, the ER determines that it is an ER for the multicast data packet. In response to determining that the ER is an ER for the multicast data packet, the ER the ER strips the BM from the multicast data packet, and performs any other decapsulation operations, at 1006. The ER forwards the packet to the host(s) at 1008.

Explicit Tracking

When forwarding a multicast data packet using BIER, the sender of the multicast data packet is typically irrelevant for the purposes of forwarding the multicast data packet. For example, a multicast data packet received at a BIER-enabled node has a label that the BIER-enabled node advertised, or that is derived from a label the BIER-enabled node advertised. However, the label does not provide any insight into which of the BIER-enabled node's neighbors sent the multicast data packet, and such information is typically irrelevant for the purposes of forwarding the packets.

In some scenarios, it may be helpful for a BIER-enabled node to be able to identify which neighbor has sent a packet. For example, rather than the BIER-enabled node updating an outgoing multicast data packet's BM, the BIER-enabled node can update the BM upon receipt of the multicast data packet. However, this involves applying information based on which BIER-enabled node the multicast data packet was received from. That is, the BIER-enabled node that sent the multicast data packet provides the BFT entry's BM value that was used to make the forwarding determination. Then the receiving BIER-enabled node applies the BM (performs an AND operation) to the incoming multicast data packet's BM in response to receiving the multicast data packet and determining which BIER-enabled node sent the packet. This is referred to as ingress filtering. One way to implement ingress filtering using MPLS is for a BIER-enabled node to allocate a label range for each of its neighbors. In response to receiving a multicast data packet, the BIER-enabled node can determine which neighbor sent the packet by inspecting the incoming label.

Figure 11:
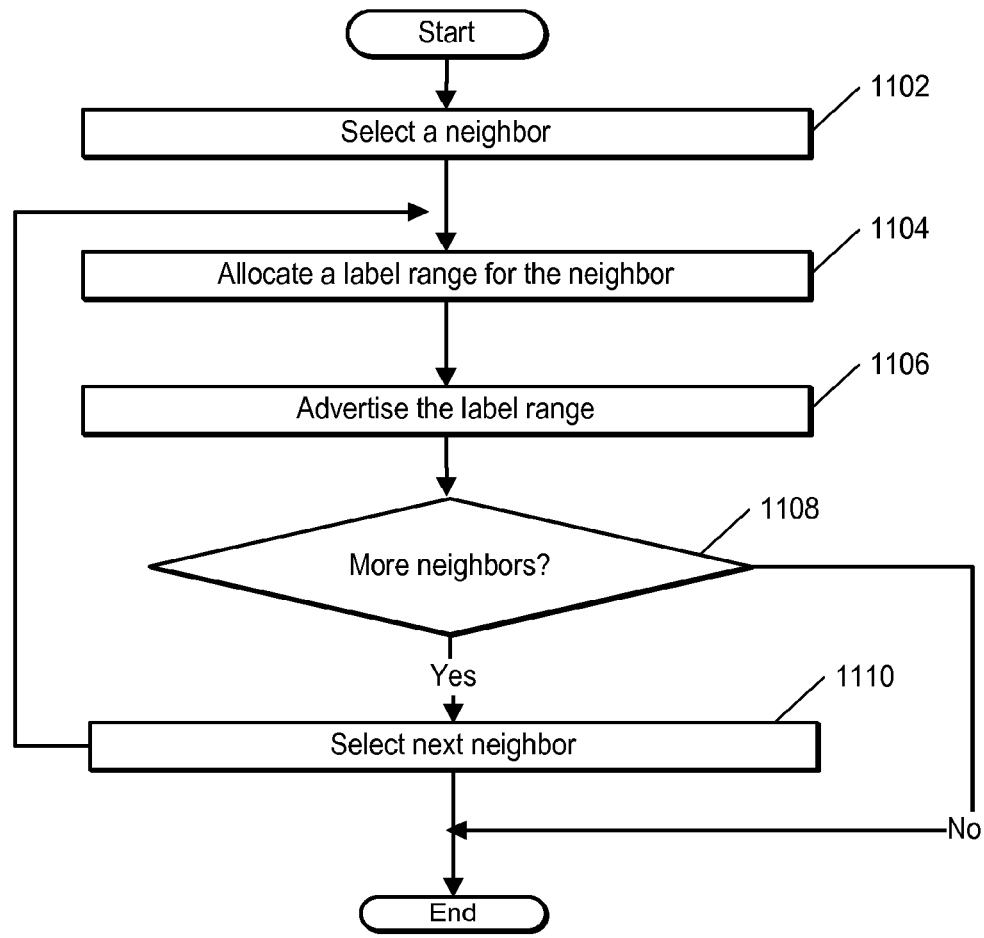
FIG. 11 is a flow chart illustrating an example process employed by a node of FIG. 4.

FIG. 11 shows one method of allocating a label range for each of several neighbors. In one embodiment, FIG. 11 is performed by a BIER-enabled node, such as one of the BIER-enabled of FIG. 4. At 1102, the BIER-enabled node selects a neighbor using, for example, the BIER-enabled node's BRT and/or BFT. At 1104, the BIER-enabled allocates a label range for the selected neighbor. At 1106, the BIER-enabled node advertises the label range. In one embodiment, the BIER-enabled node sends the label range to the neighbor that corresponds to the label range. Alternatively, the BIER-enabled node can globally advertise the label range and information identifying the BIER-enabled node that corresponds to the label range. At 1108, the BIER-enabled node determines whether more neighbors exist. If so, the BIER-enabled node selects the next neighbor and the method returns to 1104.

ECMP

Figure 12:
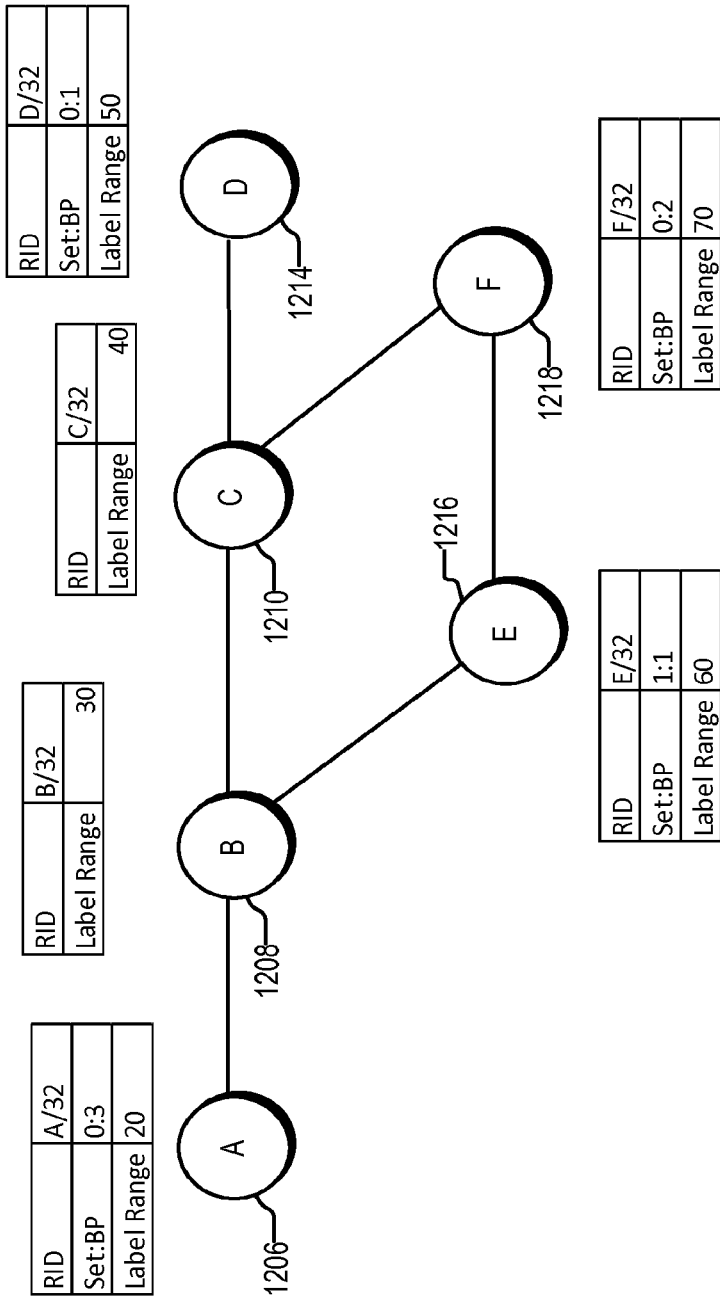
FIG. 12 is a simplified block diagram illustrating certain components of an example network.

In certain network configurations, such as shown in FIG. 12, BIER-enabled nodes may be reachable over multiple paths where each of the multiple paths has an equal cost. That is, there is not one shortest path between a BIER-enabled node and its neighbor, instead there are more than one. Deciding how to forward multicast data packets in this case is known as equal cost multi-path (ECMP) forwarding. If the ECMP paths run via parallel links, no special procedures are required since the BM value does not change because multicast data packets are forwarded to the same neighbor. If the ECMP paths run through different routers, the BM value is different.

FIG. 12 is similar to FIG. 4, in that FIG. 12 depicts an example network 1200. Network 1200 includes BIER-enabled nodes 1206-1218. BIER-enabled nodes 1206-1218 form a provider network, or domain. Such a provider network could be employed by an internet service provider to transport packets to customers. The domain includes core nodes 1208 and 1210, and provider edge nodes 1206, 1214, 1216, and 1218. Each BIER-enabled node is assigned and advertises the RID shown. In the case of IR 1206 and ERs 1214, 1216, and 1218, the SI and BP shown are also assigned and advertised. Each BIER-enabled node also allocates and advertises the label range value shown. BIER-enabled node 1216 is shown as being assigned a BP in set 1. BIER-enabled nodes 1206, 1214, and 1218 are in set 0. Each BIER-enabled node has allocated a label range such that each set has its own label. If BIER-enabled node 1206 forwards a multicast data packet having one or more BPs set for BPs in set 0, BIER-enabled node 1206 uses label 20. If BIER-enabled node 1206 forwards a multicast data packet having one or more BPs set for BPs in set 1, BIER-enabled node 1206 uses label 21. In this example there are two sets (0 and 1), so the range is 2 labels long. If there were a third set, e.g., set 2, BIER-enabled node 1206 would use label 22 for BPs in set 2. In one embodiment, each BIER-enabled node allocates a contiguous range of labels, e.g., 256 labels, to accommodate a set length used by some or all of the BIER-enabled nodes in the network. In the example of FIG. 12, we assume the BM length is the same on all BIER-enabled nodes.

One notable difference between FIG. 12 and FIG. 4 is that in FIG. 12, BIER-enabled node B (1208) has ECMP reachability to BIER-enabled node F (1218) via BIER-enabled node C (1210) and BIER-enabled node E (1216). This means that BIER-enabled node B can send multicast data packets either via BIER-enabled node C or BIER-enabled node E. This is reflected in the BRT shown at FIG. 13A and the BFT shown at FIG. 13B.

FIG. 13A shows a bit routing table 1300 for BIER-enabled node B (1208 in FIG. 12). Bit routing table 1300 includes a column 1302 that includes information identifying the router IDs for each BIER-enabled node in the BRT. Bit routing table 1300 includes, at 1304, information identifying a set ID and bit position of the BIER-enabled node identified in the router ID column. At 1306, bit routing table 1300 includes a label column which includes information identifying the label range used by each of the routers identified in column 1302. At 1308, bit routing table 1300 includes a column with information identifying the next hop BIER-enabled node along a shortest path from the BIER-enabled node that generated the BRT towards the router ID whose router ID is included in column 1302.

Bit forwarding table 1320 of FIG. 13B includes information used by BIER-enabled node to forward multicast data packets. In this case, bit forwarding table 1320 is maintained by BIER-enabled node 1208 of FIG. 12. Bit forwarding table 1320 includes a local label column 1322, a bit position column 1324, a bit mask column 1326, a neighbor column 1328, and a remote label column 1330.

The BRT and BFT indicate that the ER that corresponds to bit position 2 (BIER-enabled node F) is reachable via both C and E. BIER-enabled node B selects one of the entries and performs forwarding (e.g., BM updates and label swapping) accordingly. BIER-enabled node B can utilize, for example, entropy values, a hash of the IP header in the multicast data packet, round robin, or any other technique or algorithm to determine which BFT entry to use and which neighbor to forward the multicast data packet to.

Multiple Bit Mask Sizes

Figure 14:
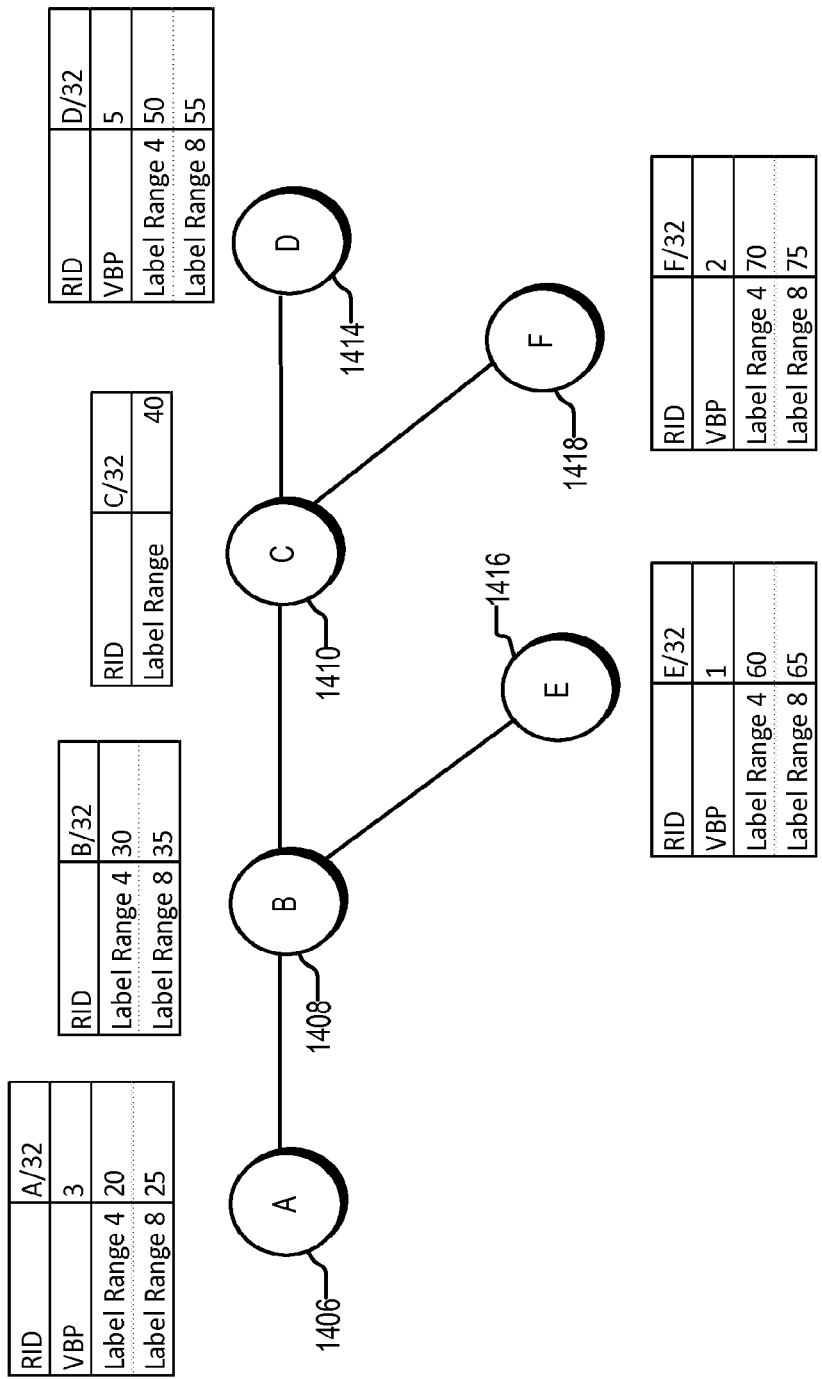
FIG. 14 is a simplified block diagram illustrating certain components of an example network.

FIG. 14 is similar to FIG. 4, in that FIG. 14 depicts an example network 1400. Network 1400 includes BIER-enabled nodes 1406-1418. BIER-enabled nodes 1406-1418 form a provider network, or domain. Such a provider network could be employed by an internet service provider to transport packets to customers. The domain includes core nodes 1408 and 1410, and provider edge nodes 1406, 1414, 1416, and 1418. Each BIER-enabled node is assigned and advertises the RID shown. In the case of IR 1406 and ERs 1414, 1416, and 1418, the virtual bit position (VBP) is also assigned and advertised. The VBP corresponds to the SI and BP assigned to the given BIER-enabled node.

Each BIER-enabled node also allocates and advertises a label range value for each BM size the BIER-enabled node is configured to use. In the example of FIG. 14, BIER-enabled node C (1410) supports a BM length of 4 bits. All other BIER-enabled nodes support a BM length of 8 in addition to supporting a BM length of 4. Since the Bit Mask length for each BIER-enabled node is advertised throughout the BIER network, each BIER-enabled node can determine the BM lengths that are available. In the example of FIG. 14, BIER-enabled node D (1414) has a VBP of 5. This means that BIER-enabled node D cannot be reached via node C using a single set.

FIG. 15A shows a bit routing table 1500 for BIER-enabled node B (1408 in FIG. 14). Bit routing table 1500 includes a column 1502 that includes information identifying the router IDs for each BIER-enabled node in the BRT. Bit routing table 1500 includes, at 1504, information identifying a VBP (which encodes set ID and bit position) of the BIER-enabled node identified in the router ID column. At 1506, bit routing table 1500 includes a label column which includes information identifying the label range used by each of the BIER-enabled nodes identified in column 1502. Column 1502 includes a label range value for each BM size used by the BIER-enabled node. For example, the label range value used by BIER-enabled node D for a 4-bit BM is 50 and the label range value used by BIER-enabled node D for an 8-bit BM is 55. BIER-enabled node C has a label range value only for a 4-bit BM since BIER-enabled node C does not support an 8-bit BM. At 1508, bit routing table 1500 includes a column with information identifying the next hop BIER-enabled node along a shortest path from the BIER-enabled node that generated the BRT towards the ER whose router ID is included in column 1502.

Bit forwarding table 1520 of FIG. 15B includes information used by BIER-enabled node to forward multicast data packets. In this case, bit forwarding table 1520 is maintained by BIER-enabled node B (1408 of FIG. 14). Bit forwarding table 1520 includes a local label column 1522, a bit position column 1524, a bit mask column 1526, a neighbor column 1528, and a remote label column 1530. The entries corresponding to an 8-bit BM (label 35) for BIER-enabled node C are blank, since BIER-enabled node C does not support 8-bit BMs and thus did not advertise a label range value for 8-bit BMs. Each BIER-enabled node (except BIER-enabled node C) has allocated and advertised a label range for two different BM lengths (e.g., 4 and 8). If BIER-enabled node A wishes to send a multicast data packet to BIER-enabled node D (via BIER-enabled node B), it encodes the multicast data packet with a BM length of 4 and forwards the multicast data packet using the labels that correspond to BM length 4. The multicast data packet sent by BIER-enabled node A will be in set 1 with BP 1 {1:1}. This means the top label inserted by BIER-enabled node A is 31. The BIER-enabled node that is forwarding a multicast data packet determines which BM length to use based on the BM lengths used by the BIER-enabled node's neighbors on the shortest path to the multicast data packet's destination. In one embodiment, the sending BIER-enabled node may determines the largest BM length supported by all BIER-enabled nodes on the path and uses the largest BM possible when forwarding the multicast data packet.

FIG. 15C shows one embodiment of how BIER-enabled node B programs its BFT to overcome the problem of a BIER-enabled node that does not support BM sizes as large as its neighbors. Bit forwarding table 1540 includes a local label column 1542, a bit position column 1544, a bit mask column 1546, a neighbor column 1548, and a remote label column 1550. For those entries in the BFT that do not have the remote label field populated, e.g., due to the NBR being unable to support the BM size, the BIER-enabled node converts the larger BMs to smaller bit masks using sets. In this example, the lower 4 bits are assigned to set 0. The remote label for BIER-enabled node C's set 0 (which is 40) is inserted into the remote label field, and the upper 4 bits of the 8-bit BM are cleared. The upper 4 bits are assigned to set 1. The remote label for BIER-enabled node C's set 1 (which is 41) is inserted into the remote label field, and the lower 4 bits of the 8-bit BM are cleared. This causes BIER-enabled node B to send two copies of the multicast data packet to BIER-enabled node C, one copy for BP 2 and one copy for BP 5. For the multicast data packet that is sent to BIER-enabled node C, the PBM includes the lower 4 bits of the 8-bit BM entry. The BIER-enabled node shift the PBM to the right by (SI*Max BM Length), where Max BM Length refers to the maximum BM size used by the BIER-enabled node that uses the shorter BM, BIER-enabled node C in this example.

Figure 16:
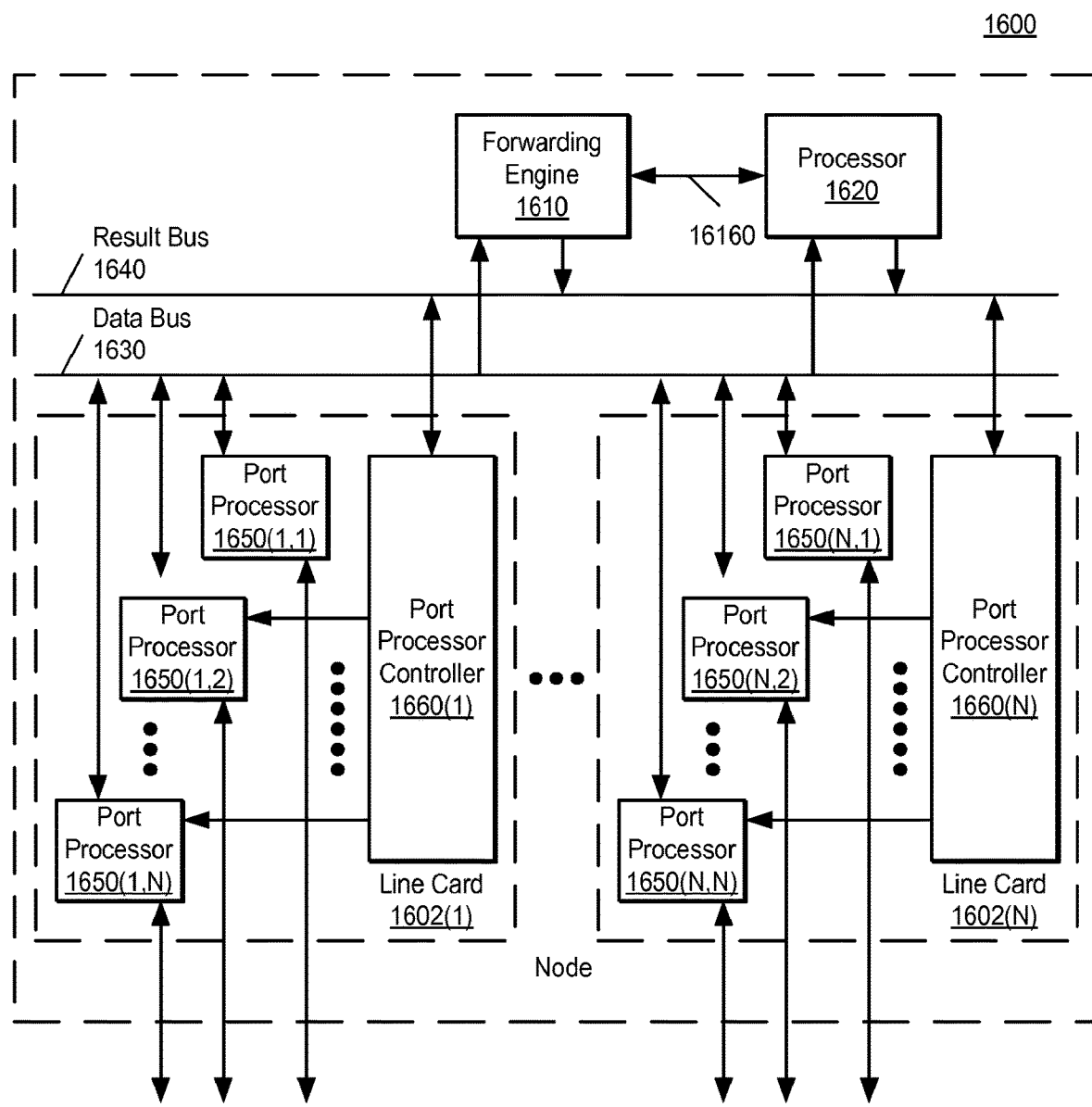
FIG. 16 is a block diagram illustrating certain components of an example node that can be employed in the network of FIG. 2.

FIG. 16 is a block diagram illustrating certain additional and/or alternative components of nodes that can be employed, for example in the networks shown in FIGS. 2, 4, 12, and 14. In this depiction, node 1600 includes a number of line cards (line cards 1602(1)-(N)) that are communicatively coupled to a forwarding engine or packet forwarder 1610 and a processor 1620 via a data bus 1630 and a result bus 1640. Line cards 1602(1)-(N) include a number of port processors 1650(1,1)-(N,N) which are controlled by port processor controllers 1660(1)-(N). It will also be noted that forwarding engine 1610 and processor 1620 are not only coupled to one another via data bus 1630 and result bus 1640, but are also communicatively coupled to one another by a communications link 16160.

The processors 1650 and 1660 of each line card 1602 may be mounted on a single printed circuit board. When a packet or packet and header are received, the packet or packet and header may be identified and analyzed by router 1600 in the following manner Upon receipt, a packet (or some or all of its control information) or packet and header is sent from the one of port processors 1650(1,1)-(N,N) at which the packet or packet and header was received to one or more of those devices coupled to data bus 1630 (e.g., others of port processors 650(1,1)-(N,N), forwarding engine 1610 and/or processor 1620). Handling of the packet or packet and header can be determined, for example, by forwarding engine 1610. For example, forwarding engine 1610 may determine that the packet or packet and header should be forwarded to one or more of port processors 1650(1,1)-(N,N). This can be accomplished by indicating to corresponding one(s) of port processor controllers 1660(1)-(N) that the copy of the packet or packet and header held in the given one(s) of port processors 1650(1,1)-(N,N) should be forwarded to the appropriate one of port processors 1650(1,1)-(N,N). In addition, or alternatively, once a packet or packet and header has been identified for processing, forwarding engine 1610, processor 1620 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 17:
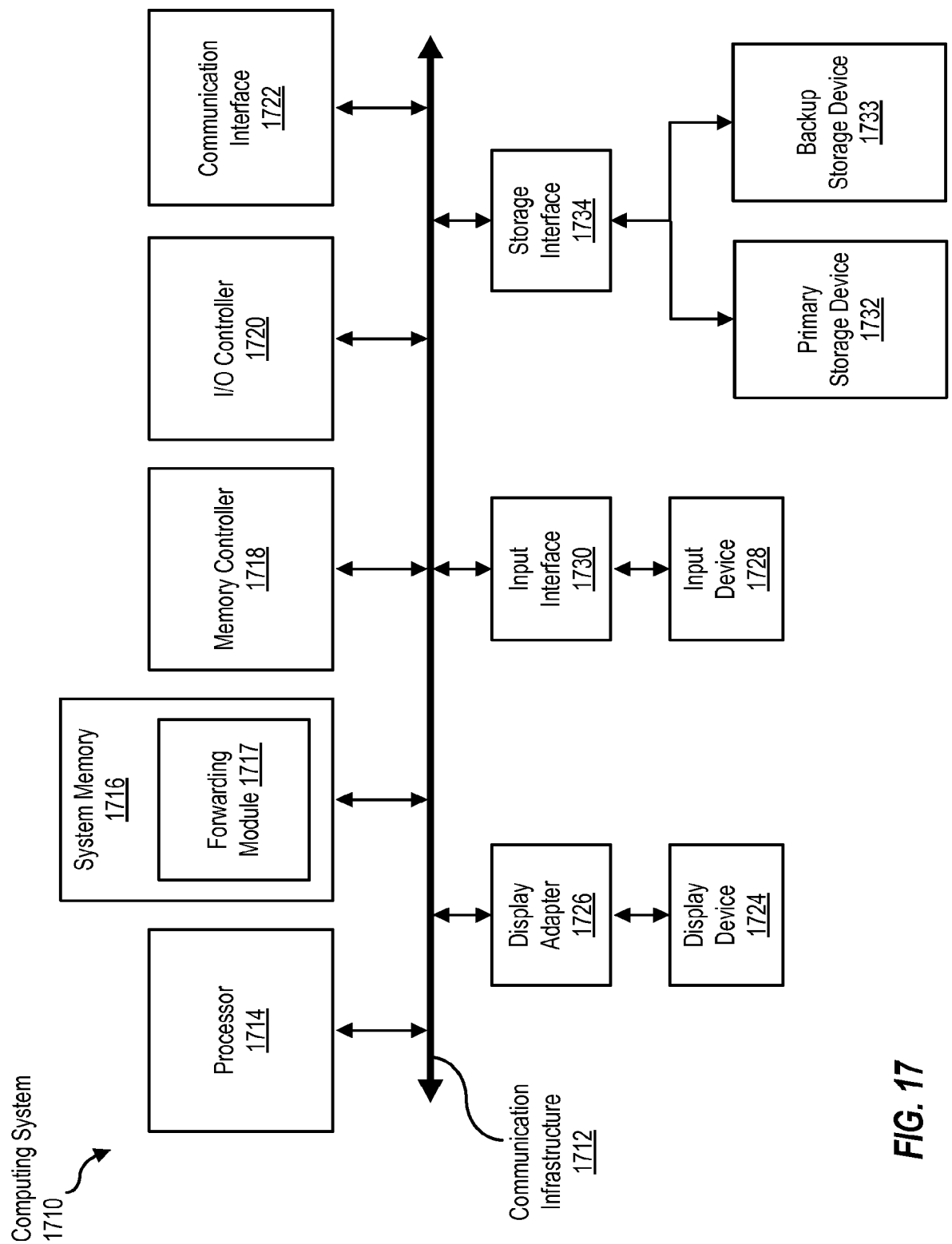
FIG. 17 is a block diagram depicting a computer system suitable for implementing embodiments of the systems described herein.

FIG. 17 is a block diagram of a computing device, illustrating how a forwarding module can be implemented in software, as described above. Computing system 1710 broadly represents any single or multi-processor computing device or system capable of executing computer-readable instructions. Examples of computing system 1710 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1710 may include at least one processor 1714 and a system memory 1716. By executing the software that implements a forwarding module 1717, computing system 1710 becomes a special purpose computing device that is configured to perform packet forwarding, in the manner described above.

Processor 1714 generally represents any type or form of processing unit capable of processing data or interpreting and executing instructions. In certain embodiments, processor 1714 may receive instructions from a software application or module. These instructions may cause processor 1714 to perform the functions of one or more of the embodiments described and/or illustrated herein. For example, processor 1714 may perform and/or be a means for performing the operations described herein. Processor 1714 may also perform and/or be a means for performing any other operations, methods, or processes described and/or illustrated herein.

System memory 1716 generally represents any type or form of volatile or non-volatile storage device or medium capable of storing data and/or other computer-readable instructions. Examples of system memory 1716 include, without limitation, random access memory (RAM), read only memory (ROM), flash memory, or any other suitable memory device. Although not required, in certain embodiments computing system 1710 may include both a volatile memory unit (such as, for example, system memory 1716) and a non-volatile storage device (such as, for example, primary storage device 1732, as described in detail below). In one example, program instructions executable to implement a forwarding module configured to forward multicast data packets may be loaded into system memory 1716.

In certain embodiments, computing system 1710 may also include one or more components or elements in addition to processor 1714 and system memory 1716. For example, as illustrated in FIG. 17, computing system 1710 may include a memory controller 1718, an Input/Output (I/O) controller 1720, and a communication interface 1722, each of which may be interconnected via a communication infrastructure 1712. Communication infrastructure 1714 generally represents any type or form of infrastructure capable of facilitating communication between one or more components of a computing device. Examples of communication infrastructure 1714 include, without limitation, a communication bus (such as an Industry Standard Architecture (ISA), Peripheral Component Interconnect (PCI), PCI express (PCIe), or similar bus) and a network.

Memory controller 1718 generally represents any type or form of device capable of handling memory or data or controlling communication between one or more components of computing system 1710. For example, in certain embodiments memory controller 1718 may control communication between processor 1714, system memory 1716, and I/O controller 1720 via communication infrastructure 1714. In certain embodiments, memory controller 1718 may perform and/or be a means for performing, either alone or in combination with other elements, one or more of the operations or features described and/or illustrated herein.

I/O controller 1720 generally represents any type or form of module capable of coordinating and/or controlling the input and output functions of a computing device. For example, in certain embodiments I/O controller 1720 may control or facilitate transfer of data between one or more elements of computing system 1710, such as processor 1714, system memory 1716, communication interface 1722, display adapter 1726, input interface 1730, and storage interface 1734.

Communication interface 1722 broadly represents any type or form of communication device or adapter capable of facilitating communication between computing system 1710 and one or more additional devices. For example, in certain embodiments communication interface 1722 may facilitate communication between computing system 1710 and a private or public network including additional computing systems. Examples of communication interface 1722 include, without limitation, a wired network interface (such as a network interface card), a wireless network interface (such as a wireless network interface card), a modem, and any other suitable interface. In at least one embodiment, communication interface 1722 may provide a direct connection to a remote server via a direct link to a network, such as the Internet. Communication interface 1722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1722 may also represent a host adapter configured to facilitate communication between computing system 1710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1722 may also allow computing system 1710 to engage in distributed or remote computing. For example, communication interface 1722 may receive instructions from a remote device or send instructions to a remote device for execution.

As illustrated in FIG. 17, computing system 1710 may also include at least one display device 1724 coupled to communication infrastructure 1714 via a display adapter 1726. Display device 1724 generally represents any type or form of device capable of visually displaying information forwarded by display adapter 1726. Similarly, display adapter 1726 generally represents any type or form of device configured to forward graphics, text, and other data from communication infrastructure 1714 (or from a frame buffer) for display on display device 1724.

As illustrated in FIG. 17, computing system 1710 may also include at least one input device 1728 coupled to communication infrastructure 1714 via an input interface 1730. Input device 1728 generally represents any type or form of input device capable of providing input, either computer or human generated, to computing system 1710. Examples of input device 1728 include, without limitation, a keyboard, a pointing device, a speech recognition device, or any other input device.

As illustrated in FIG. 17, computing system 1710 may also include a primary storage device 1732 and a backup storage device 1733 coupled to communication infrastructure 1714 via a storage interface 1734. Storage devices 1732 and 1733 generally represent any type or form of storage device or medium capable of storing data and/or other computer-readable instructions. For example, storage devices 1732 and 1733 may be a magnetic disk drive (e.g., a so-called hard drive), a floppy disk drive, a magnetic tape drive, an optical disk drive, a flash drive, or the like. Storage interface 1734 generally represents any type or form of interface or device for transferring data between storage devices 1732 and 1733 and other components of computing system 1710. A storage device like primary storage device 1732 can store information such as routing tables and forwarding tables.

In certain embodiments, storage devices 1732 and 1733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1732 and 1733 may also include other similar structures or devices for allowing computer software, data, or other computer-readable instructions to be loaded into computing system 1710. For example, storage devices 1732 and 1733 may be configured to read and write software, data, or other computer-readable information. Storage devices 1732 and 1733 may also be a part of computing system 1710 or may be a separate device accessed through other interface systems.

Many other devices or subsystems may be connected to computing system 1710. Conversely, all of the components and devices illustrated in FIG. 17 need not be present to practice the embodiments described and/or illustrated herein. The devices and subsystems referenced above may also be interconnected in different ways from that shown in FIG. 17.

Computing system 1710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1710 for storage in memory via a network such as the Internet or upon a carrier medium.

The computer-readable medium containing the computer program may be loaded into computing system 1710. All or a portion of the computer program stored on the computer-readable medium may then be stored in system memory 1716 and/or various portions of storage devices 1732 and 1733. When executed by processor 1714, a computer program loaded into computing system 1710 may cause processor 1714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1710 may be configured as an application specific integrated circuit (ASIC) adapted to implement one or more of the embodiments disclosed herein.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method performed by a node, the method comprising:
selecting a bit forwarding table based, at least in part, on information in a received packet, wherein
the bit forwarding table is associated with one or more label values,
the received packet comprises a top label and a bit mask, and
the bit forwarding table is selected, at least in part, in response to a determination that the top label of the received packet is associated with a BIER-enabled node;
selecting a row as a selected row in the bit forwarding table, wherein
the selected row is selected based, at least in part, on a label value identified in the top label and a bit position value corresponding to a first set bit in the bit mask, and
the selected row comprises a routing label associated with a neighbor node;
copying the received packet to create a copied packet;
replacing the top label in the copied packet with the routing label from the selected row of the bit forwarding table; and
forwarding the copied packet to the neighbor node, wherein the forwarding is based, at least in part, on the routing label.

2. The method of claim 1, wherein
each of the one or more label values associated with the bit forwarding table corresponds to at least one bit position values.

3. The method of claim 1, wherein
the copied packet comprises a copy of the bit mask.

4. The method of claim 3, further comprising
prior to the forwarding, modifying the copy of the bit mask of the copied packet by clearing one or more bits that had been set in the received packet.

5. The method of claim 3, wherein
the selected row further comprises
a bit mask value,
information identifying the neighbor node, and
a routing label associated with the neighbor node.

6. The method of claim 1, further comprising
selecting a second row as a second selected row in the bit forwarding table, wherein
the selected row is selected based, at least in part, on the label value identified in the top label and a second bit position value corresponding to a second set bit in the bit mask, and
the second selected row comprises a second routine label associated with a second neighbor node;
copying the received packet to create a second copied packet; and
forwarding the second copied packet to the second neighbor node, wherein
the forwarding is based, at least in part, on the second routing label.

7. The method of claim 6, further comprising:
prior to forwarding the second copied packet, replacing the top label in the second copied packet with the routing label from the second selected row of the bit forwarding table.

8. A network device comprising:
one or more network interface cards;
a memory configured to store a bit routing table; and
a processor configured to perform a method comprising:
selecting a bit forwarding table based, at least in part, on information in a received packet, wherein
the bit forwarding table is associated with one or more label values,
the received packet comprises a top label and a bit mask, and
the bit forwarding table is selected, at least in part, in response to a determination that the top label of the received packet is associated with a BIER-enabled node;
selecting a row as a selected row in the bit forwarding table, wherein
the selected row is selected based, at least in part, on a label value identified in the top label and a bit position value corresponding to a first set bit in the bit mask, and
the selected row comprises a routing label associated with a neighbor node;
copying the received packet to create a copied packet;
replacing the top label in the copied packet with the routing label from the selected row of the bit forwarding table; and
forwarding the copied packet to the neighbor node, wherein
the forwarding is based, at least in part, on the routing label.

9. The network device of claim 8, wherein
each of the one or more label values associated with the bit forwarding table corresponds to at least one bit position values.

10. The network device of claim 8, wherein the copied packet comprises a copy of the bit mask.

11. The network device of claim 10, wherein the method further comprises:
prior to the forwarding, modifying the copy of the bit mask of the copied packet by clearing one or more bits that had been set in the received packet.

12. The network device of claim 10, wherein
the selected row further comprises
a bit mask value, information identifying the neighbor node, and
a routing label associated with the neighbor node.

13. The network device of claim 8, wherein the method further comprises:
selecting a second row as a second selected row in the bit forwarding table, wherein
the selected row is selected based, at least in part, on the label value identified in the top label and a second bit position value corresponding to a second set bit in the bit mask, and
the second selected row comprises a second routing label associated with a second neighbor node;
copying the received packet to create a second copied packet; and
forwarding the second copied packet to the second neighbor node, wherein
the forwarding is based, at least in part, on the second routing label.

14. The network device of claim 13, wherein the method further comprises:
  prior to forwarding the second copied packet, replacing the top label in the second copied packet with the routing label from the second selected row of the bit forwarding table.

15. A system comprising
  a first node configured to perform a method comprising:
    selecting a bit forwarding table based, at least in part, on information in a received packet, wherein
      the bit forwarding table is associated with one or more label values,
      the received packet comprises a top label and a bit mask, and
      the bit forwarding table is selected, at least in part, in response to a determination that the top label of the received packet is associated with a BIER-enabled node;
    selecting a row as a selected row in the bit forwarding table, wherein
      the selected row is selected based, at least in part, on a label value identified in the top label and a bit position value corresponding to a first set bit in the bit mask, and
      the selected row comprises a routing label associated with a neighbor node;
    copying the received packet to create a copied packet;
    replacing the top label in the copied packet with the routing label from the selected row of the bit forwarding table; and
    forwarding the copied packet to the neighbor node, wherein
      the forwarding is based, at least in part, on the routing label.

16. The system of claim 15, wherein
  each of the one or more label values associated with the bit forwarding table corresponds to at least one bit position values.

17. The system of claim 15, wherein the copied packet comprises a copy of the bit mask.

18. The system of claim 17, wherein the method further comprises:
  prior to the forwarding, modifying the copy of the bit mask of the copied packet by clearing one or more bits that had been set in the received packet.

19. The system of claim 17, wherein
  the selected row further comprises
    a bit mask value, information identifying the neighbor node, and
    a routing label associated with the neighbor node.

20. The system of claim 15, wherein the method further comprises:
  selecting a second row as a second selected row in the bit forwarding table, wherein
    the selected row is selected based, at least in part, on the label value identified in the top label and a second bit position value corresponding to a second set bit in the bit mask, and
    the second selected row comprises a second routing label associated with a second neighbor node;
  copying the received packet to create a second copied packet; and
  forwarding the second copied packet to the second neighbor node, wherein
    the forwarding is based, at least in part, on the second routing label.

* * * * *